US006697728B2

(12) United States Patent
Kin et al.

(10) Patent No.: US 6,697,728 B2
(45) Date of Patent: Feb. 24, 2004

(54) VEHICLE MOTION CONTROL SYSTEM

(75) Inventors: Keiyu Kin, Wako (JP); Hiroyuki Urabe, Wako (JP); Osamu Yano, Tochigi (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 10/244,321

(22) Filed: Sep. 16, 2002

(65) Prior Publication Data

US 2003/0074123 A1 Apr. 17, 2003

(30) Foreign Application Priority Data

Oct. 11, 2001 (JP) ...................................... 2001-314527

(51) Int. Cl.[7] .................................................. B80T 8/00

(52) U.S. Cl. ........................... 701/70; 701/72; 180/197; 303/146

(58) Field of Search ............................. 701/70, 71, 72, 701/75, 78, 83, 90, 91, 41; 180/197; 303/140, 146

(56) References Cited

U.S. PATENT DOCUMENTS 5,402,345 A * 3/1995 Kost ........................... 701/74

* cited by examiner

*Primary Examiner*—Tan Q. Nguyen
(74) *Attorney, Agent, or Firm*—Fish & Richardson PC

(57) ABSTRACT

In a vehicle motion control system based on a target yaw rate scheme, a brake force computing unit brakes an outer front wheel in a controlled manner when a sign of the yaw rate has changed and the yaw rate increment has become equal to or greater than a threshold value after a counter steer action has been detected and the vehicle body slip angle has become equal to or greater than a threshold value. Thus, suppose that a vehicle travels a winding road and a counter steer action is taken. If the vehicle body slip angle and actual yaw rate increment exceed threshold values, the outer front wheel is braked. Therefore, even when the vehicle body slip angle reaches a maximum value and an attempt is made to reduce it again by a counter steer action in a similar manner as a swinging pendulum, because the increases in the yaw rate and actual yaw rate increment are predicted and monitored before the vehicle body slip angle reaches its maximum value, the vehicle is enabled to travel in a stable fashion.

2 Claims, 20 Drawing Sheets

STC
1
STAn
VWFR
VWFL
VWRR
VWRR
5a
5b
5c
5d
VVXβ
VCXmn
VCYmn
VVβ
αmn
VCmn
SLPmn
FYmn
CFmn
LGE
LGEF
μ
β
Δβ
YAWR
2
ΔYRR
CFKx
ΔYRE
CFYAWR
LG
FG
3
4
TGM
FZmn
TM
FXmn
FGE
FGEF

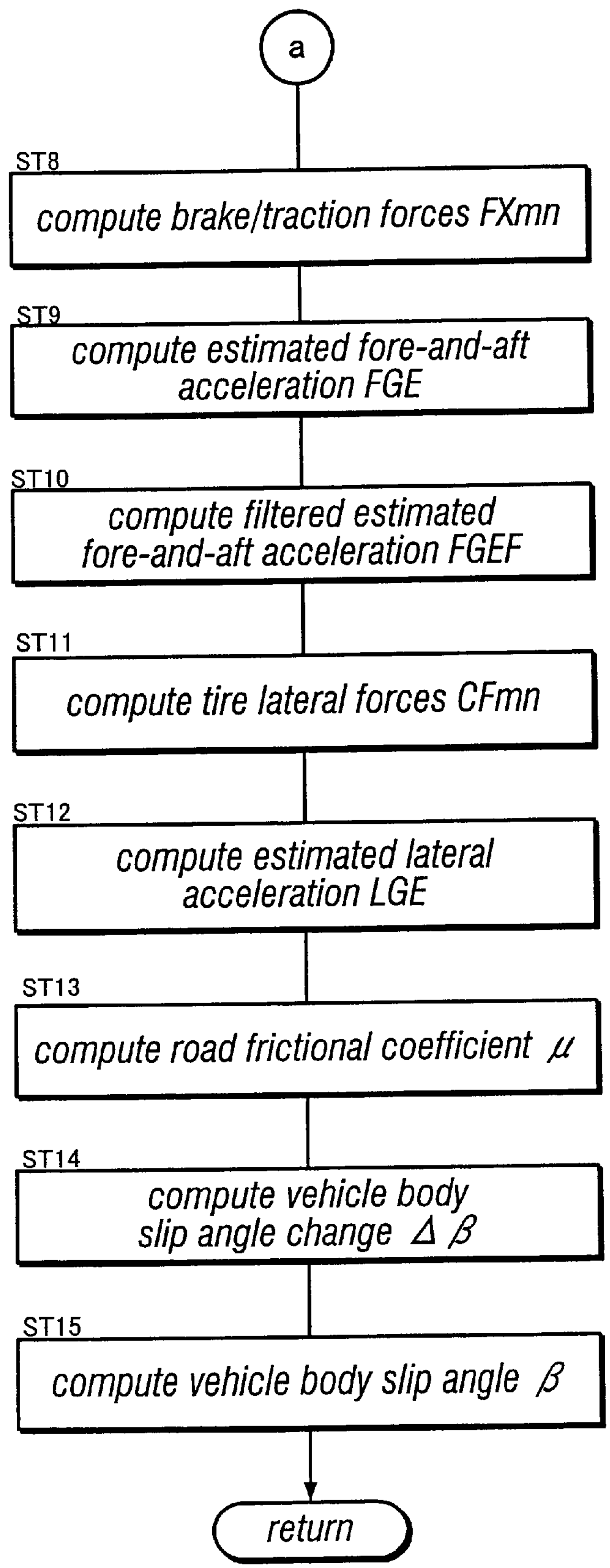
Fig. 6
a
ST8
compute brake/traction forces FXmn
ST9
compute estimated fore-and-aft acceleration FGE
ST10
compute filtered estimated fore-and-aft acceleration FGEF
ST11
compute tire lateral forces CFmn
ST12
compute estimated lateral acceleration LGE
ST13
compute road frictional coefficient μ
ST14
compute vehicle body slip angle change Δβ
ST15
compute vehicle body slip angle β
return c
b
ST13g
FGE-FG>BTFG ?
NO
YES
ST13h
μ jump?
YES
NO
ST13i
has the prescribed number been reached ?
NO
YES
ST13j
μ = μ −0.0078
ST13l
μ =TGM/TIRGRP
d
ST13n
FGE-FG>BTFG ?
NO
YES
ST13o
μ = μ +0.0078
ST13m
μ =TGM/TIRGRP
ST13k
μ limiter
return e
ST13p
has actual moment exceeded threshold value ?
NO
YES
return
ST13q
LGE≧LG ?
NO
YES
ST13r
LGE−LG>BTLG ?
NO
YES
ST13s
μ jump?
YES
NO
ST13t
has the prescribed number been reached ?
NO
YES
ST13u
μ = μ −0.0078
ST13w
μ =TGM/TIRGRP
ST13x
LG−LGE>BTLG ?
NO
YES
ST13y
μ = μ +0.0078
ST13v
μ limiter
return

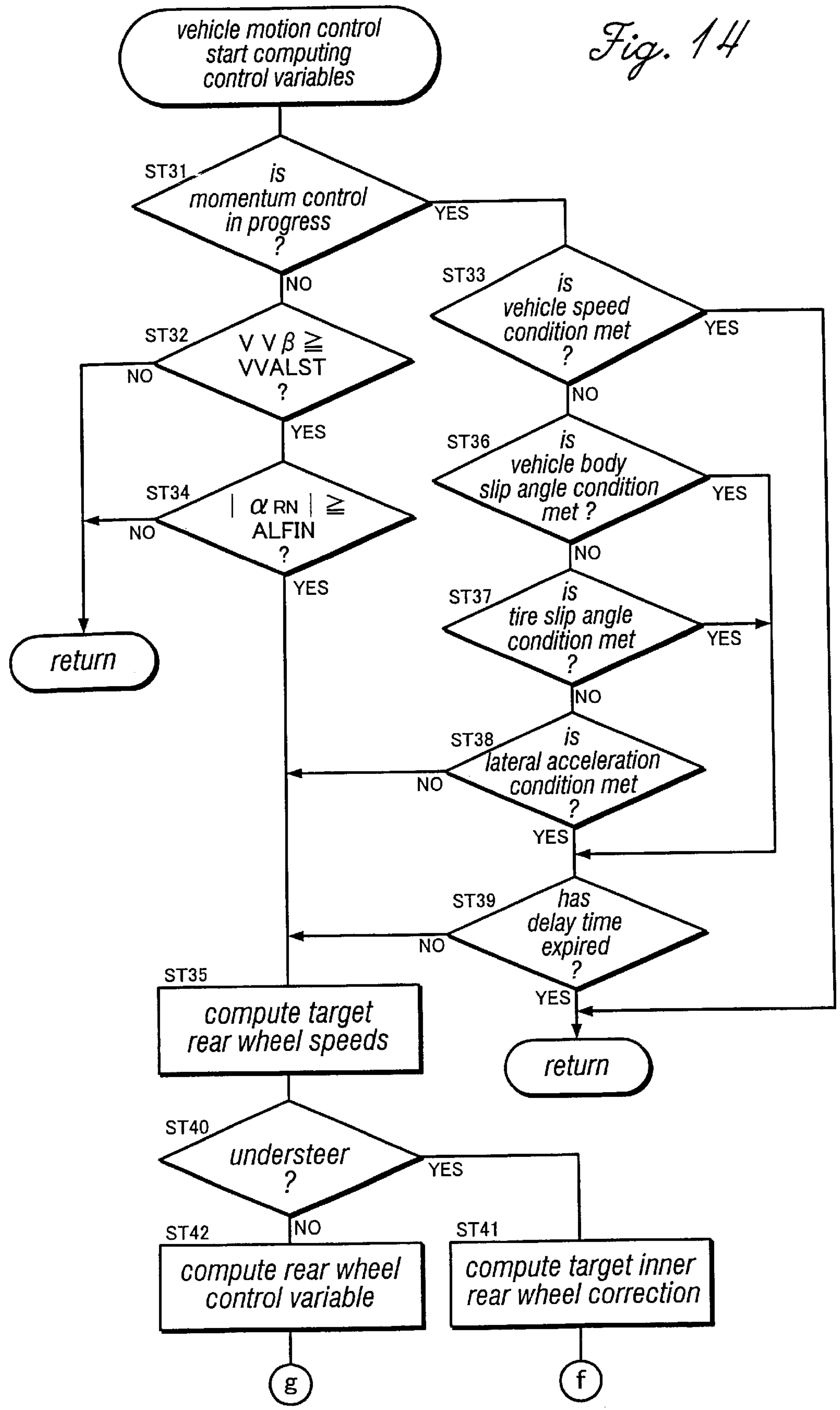

Fig. 14
vehicle motion control start computing control variables
ST31
is momentum control in progress ?
YES
NO
ST32
V Vβ ≧ VVALST ?
NO
YES
ST33
is vehicle speed condition met ?
YES
NO
ST34
| αRN | ≧ ALFIN ?
NO
YES
ST36
is vehicle body slip angle condition met ?
YES
NO
ST37
is tire slip angle condition met ?
YES
NO
return
ST38
is lateral acceleration condition met ?
NO
YES
ST39
has delay time expired ?
NO
YES
ST35
compute target rear wheel speeds
return
ST40
understeer ?
YES
NO
ST42
compute rear wheel control variable
ST41
compute target inner rear wheel correction
g
f

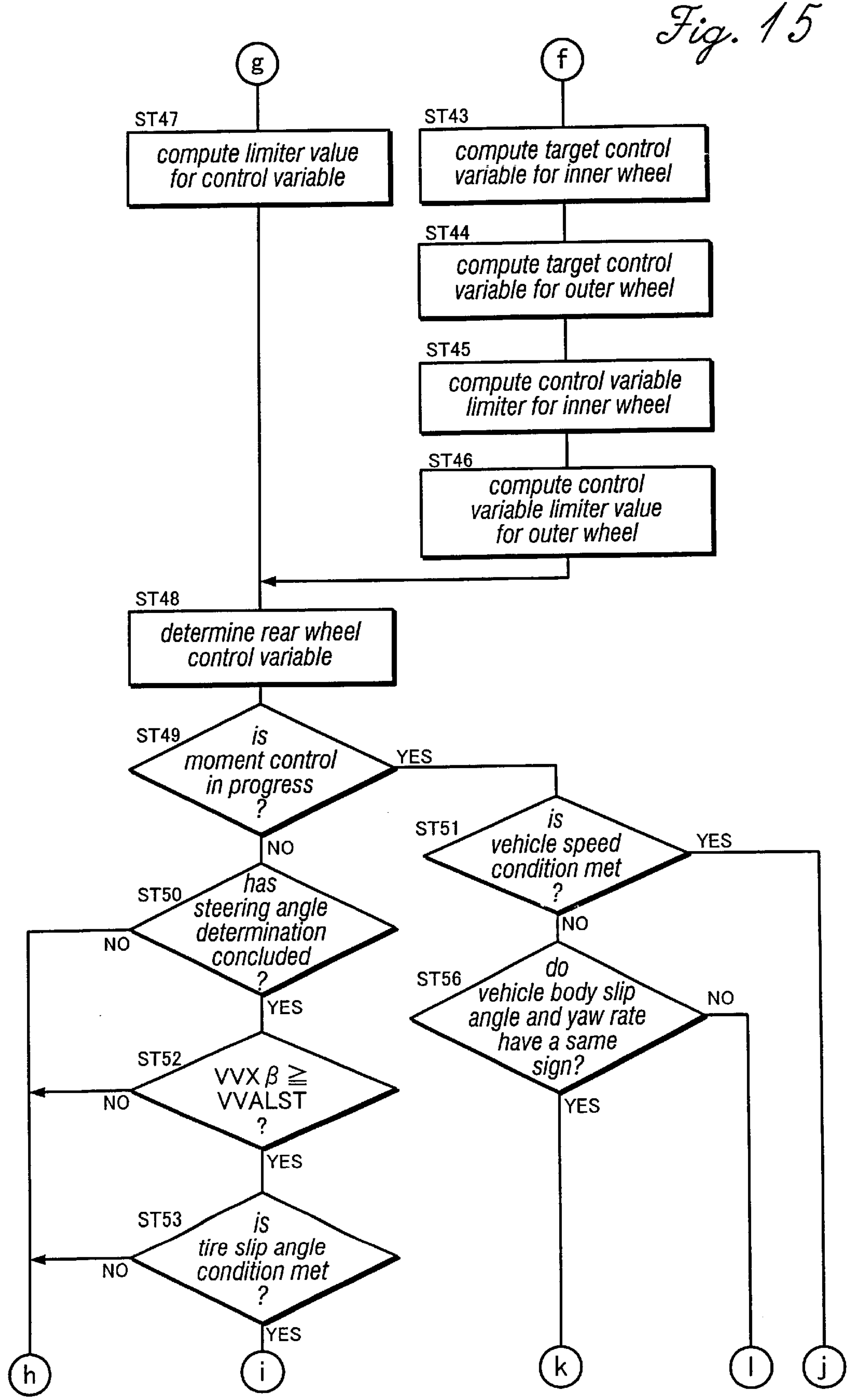
Fig. 15
g
f
ST47
compute limiter value for control variable
ST43
compute target control variable for inner wheel
ST44
compute target control variable for outer wheel
ST45
compute control variable limiter for inner wheel
ST46
compute control variable limiter value for outer wheel
ST48
determine rear wheel control variable
ST49
is moment control in progress ?
YES
NO
ST51
is vehicle speed condition met ?
YES
NO
ST50
has steering angle determination concluded ?
NO
YES
ST56
do vehicle body slip angle and yaw rate have a same sign?
NO
YES
ST52
VVX β ≧ VVALST ?
NO
YES
ST53
is tire slip angle condition met ?
NO
YES
h
i
k
l
j Pmn
ITRn
O/U
ROTTOTL
VERn
VEβ
dVEβ
d²VEβ
VIRn
O/U
RUDVR
ILOUT
ILIN
ILTOT
ROTLH
ROTLL
ROTA
MYRNO
VCmn
Δβ
STC
YAWR
VVXβ
VWRR
VWRL
CFmn
FXmn
μ
FZmn
αmn
β
1
2

15
CFNCmn
Pmn
12
INmn
ILmn
VIRn
RUDVR
VVXβ
αmn
ROTL
ROT
αmn
VVXβ
13
14
ROTL
YRRTO
ΔYRR/
ΔYRE
VVXβ
11
VVXβ
β
CFYAWR
LGE
FGE
CS
STC
VWFR
VWFL
VWRR
VWRL
YAWR
LG
FG
1
5a
5b
5c
5d
2
3
4

STC
β
VVXβ
YAWR
μ
FZmn
ΔYRR
YRRSTT
YRREN
YEYRR
YRRSTT
YRRTO
PFn

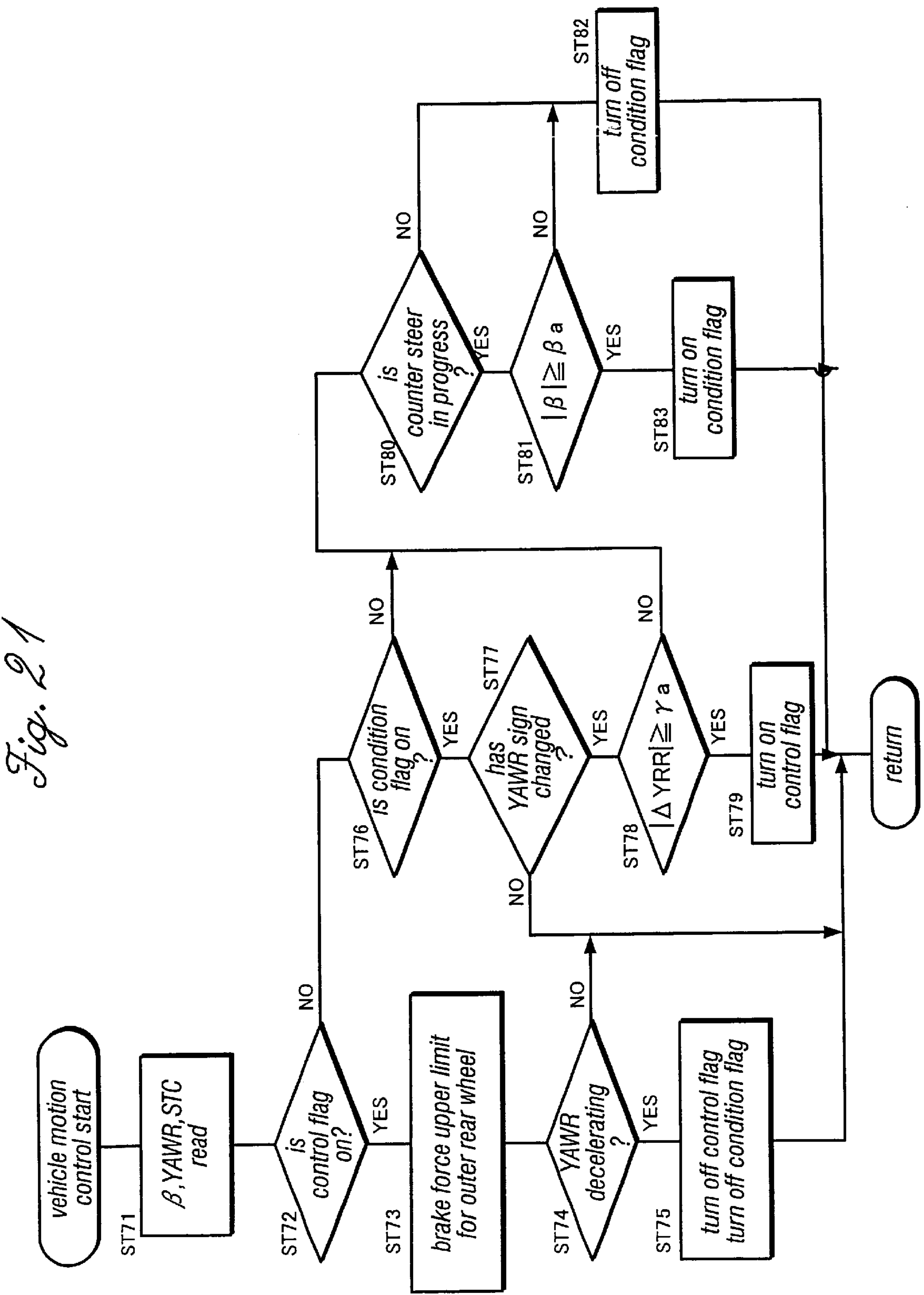
Fig. 21
vehicle motion control start
ST71
β, YAWR, STC read
ST72
is control flag on?
YES
NO
ST73
brake force upper limit for outer rear wheel
ST74
YAWR decelerating ?
YES
NO
ST75
turn off control flag
turn off condition flag
ST76
is condition flag on ?
YES
NO
ST77
has YAWR sign changed ?
YES
NO
ST78
|Δ YRR| ≧ γ a
YES
NO
ST79
turn on control flag
ST80
is counter steer in progress ?
YES
NO
ST81
|β| ≧ β a
YES
NO
ST82
turn off condition flag
ST83
turn on condition flag
return

VEHICLE MOTION CONTROL SYSTEM

TECHNICAL FIELD

The present invention relates to a vehicle motion control system for controlling the motion of a vehicle in a stable manner even when it is steered successively in opposite directions.

BACKGROUND OF THE INVENTION

Conventionally known is a vehicle motion control system which determines a dynamic variable of the vehicle as the vehicle turns a corner and controls the motion of the vehicle according to the deviation of the dynamic variable from a target value of the dynamic variable. For instance, according to a known yaw rate control system, a deviation of a yaw rate actually measured by using a yaw rate sensor from a target yaw rate computed from the steering angle is converted into a yaw moment that would eliminate the deviation, and the right and left wheels are braked individually and differently so as to produce a corresponding yaw moment. For instance, when the vehicle has an oversteer tendency, the outer wheels are braked more than the inner wheels. Conversely, when the vehicle has an understeer tendency, the inner wheels are braked more than the outer wheels.

However, according to such a conventional vehicle motion control system, when the vehicle is brought back from a state involving a large slip angle to a stable state either by the intervention of the vehicle operator or automatically by the system, an overshoot in the yaw movement of the vehicle tends to be produced due to the inertia of the vehicle, and even an oscillatory yaw movement may result.

BRIEF SUMMARY OF THE INVENTION

In view of such problems of the prior art, a primary object of the present invention is to provide a vehicle motion control system based on a target yaw rate scheme which ensures a stable motion to the vehicle under all conditions.

A second object of the present invention is to provide a vehicle motion control system based on a target yaw rate scheme which ensures a stable motion to the vehicle without requiring any significant change to the existing system.

According to the present invention, these and other objects of the present invention can be accomplished by providing a vehicle motion control system for controlling a motion of a vehicle during cornering, comprising: a steering angle sensor for detecting a steering angle; a yaw rate sensor for detecting an actual vehicle yaw rate; an actual yaw rate increment computing unit for computing an increment of the actual yaw rate; a vehicle body slip angle computing unit for estimating a vehicle body slip angle; a brake force computing unit for controlling brake forces of right and left front wheels of the vehicle; and a counter steer detecting unit for detecting a counter steer action according to the steering angle and yaw rate; the brake force computing unit being adapted to brake an outer front wheel in a controlled manner when a sign of the yaw rate has changed and the yaw rate increment has become equal to or greater than a threshold value after a counter steer action has been detected and the vehicle body slip angle has become equal to or greater than a threshold value.

Thus, suppose that a vehicle travels a winding road and a counter steer action is taken. If the vehicle body slip angle and actual yaw rate increment exceed threshold values, the outer front wheel is braked. Therefore, even when the vehicle body slip angle reaches a maximum value and an attempt is made to reduce it again by a counter steer action (in a similar manner as a swinging pendulum), because the increases in the yaw rate and actual yaw rate increment are predicted and monitored before the vehicle body slip angle reaches its maximum value, the vehicle is enabled to travel in a stable fashion.

Preferably, the counter steer detecting unit is adapted to detect a counter steer action when signs of the steering angle and yaw rate differ from each other.

BRIEF DESCRIPTION OF THE DRAWINGS

Now the present invention is described in the following with reference to the appended drawings, in which:

FIG. 6 is a second part of the general flow chart;

FIG. 14 is a first part of a subroutine flow chart for computing the degree of the vehicle momentum control;

FIG. 15 is a second part of the subroutine flow chart for computing the degree of the vehicle momentum control;

FIG. 21 is a flow chart of a vehicle motion control according to the present invention;

DETAILED DESCRIPTION OF THE PREFERRED EMBODIMENTS

Figure 1:
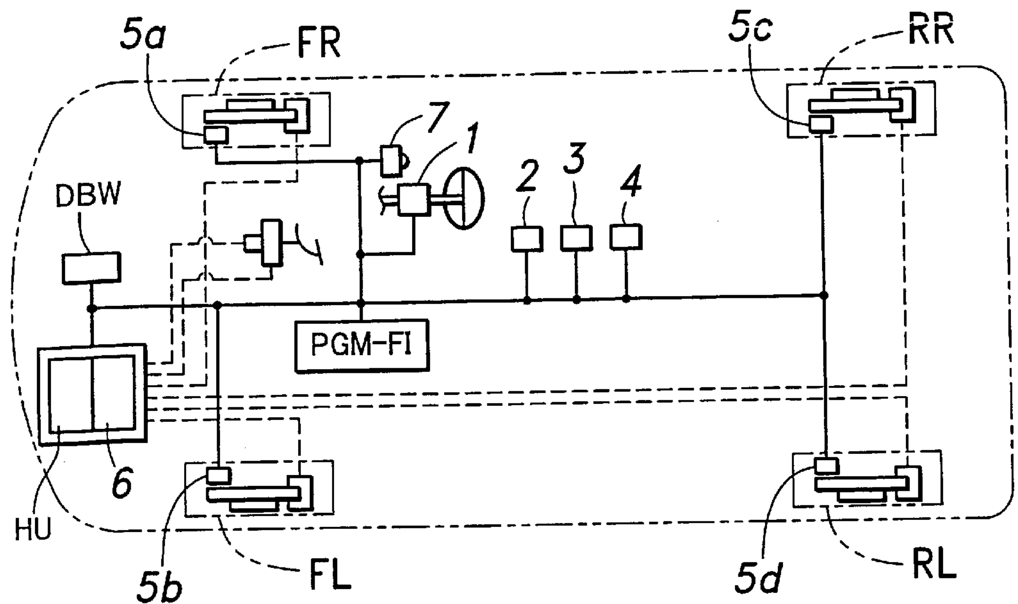
FIG. 1 is a diagram showing the overall structure of the vehicle motion control system embodying the present invention.

FIG. 1 is an overall system diagram of an automobile to which the present invention is applied. This vehicle is fitted with a steering device for steering the front wheels FR and FL which is provided with a steering sensor 1. A yaw rate sensor 2, lateral acceleration sensor 3 and fore-and-aft acceleration sensor 4 are placed in appropriate locations of the vehicle body. Each of the wheels FR, FL, RR and RL is provided with a wheel speed sensor 5*a*, 5*b*, 5*c* and 5*d* for measuring the rotational speed of the corresponding wheel. These sensors are connected to a central control unit 6. The central control unit 6 is incorporated with a brake hydraulic pressure control actuator HU for controlling the braking force of each individual wheel, and is connected to an electronic throttle controller DBW for controlling the opening degree of the engine throttle valve and a PGM-FI controller for controlling the fuel injection and ignition timing of the engine. The central control unit 6 is connected to a monitor 7 to allow the status of the central control unit 6 to be visually displayed.

Figure 2:
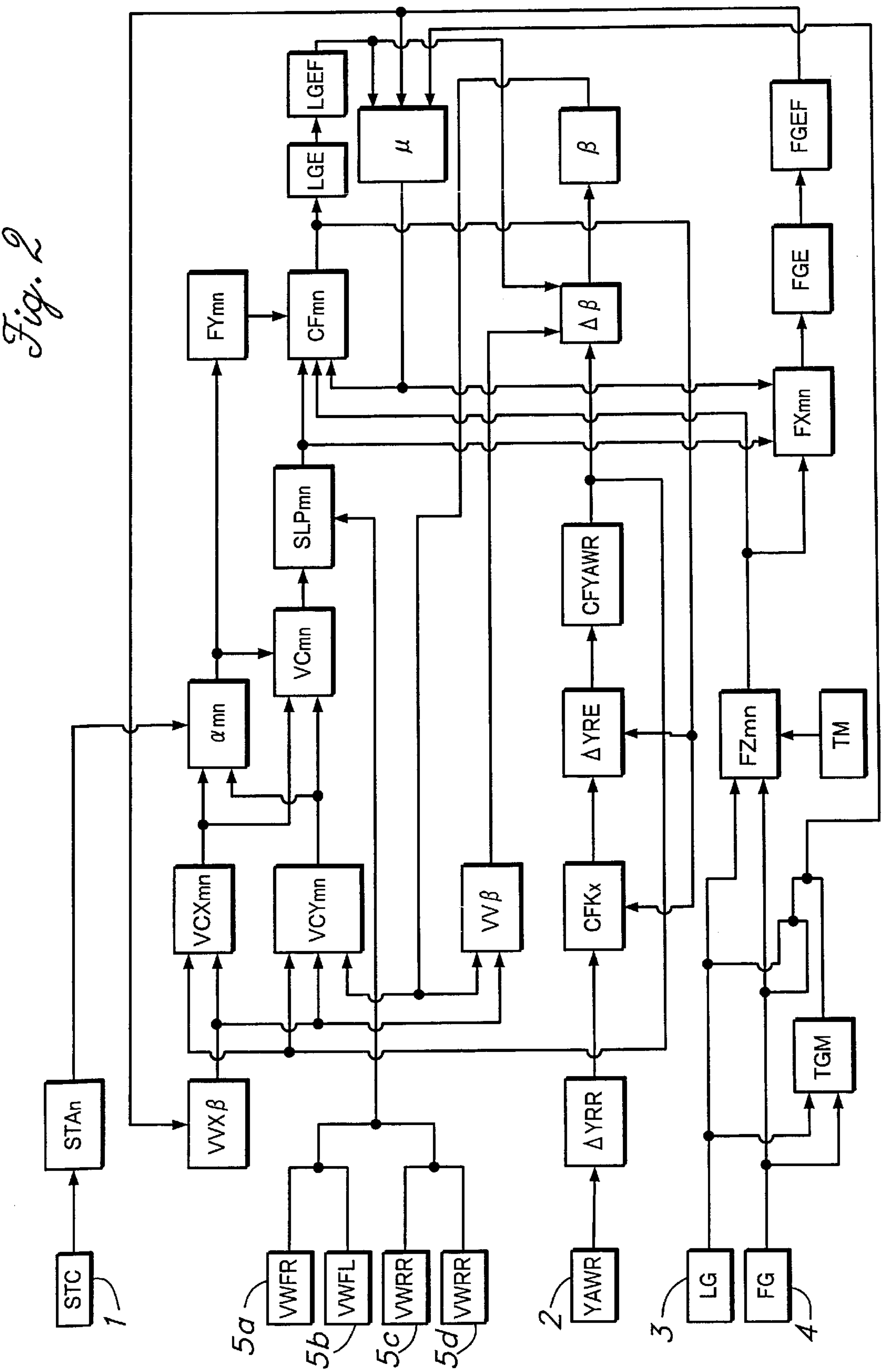
FIG. 2 is a block diagram showing the estimation logic for various control values.

FIG. 2 is a block diagram showing the estimation logic for various control variables used in the central control unit 6 embodying the present invention. In the illustrated embodiment, the values detected by the various sensors 1–4 and 5*a*–5*d* are used for determining the control variables that are needed to execute a vehicle motion control according to the present invention. This vehicle motion control is of such a kind that can achieve both a high stability and a favorable steerability, and can be extended for the use of rear wheel drive vehicles and four wheel drive vehicles as well as front wheel drive vehicles. It is essential for this vehicle motion control that the slippage of the four wheels are optimally controlled, and it is accomplished by using a four wheel brake actuator which can control the braking force of each individual wheel.

Figure 3:
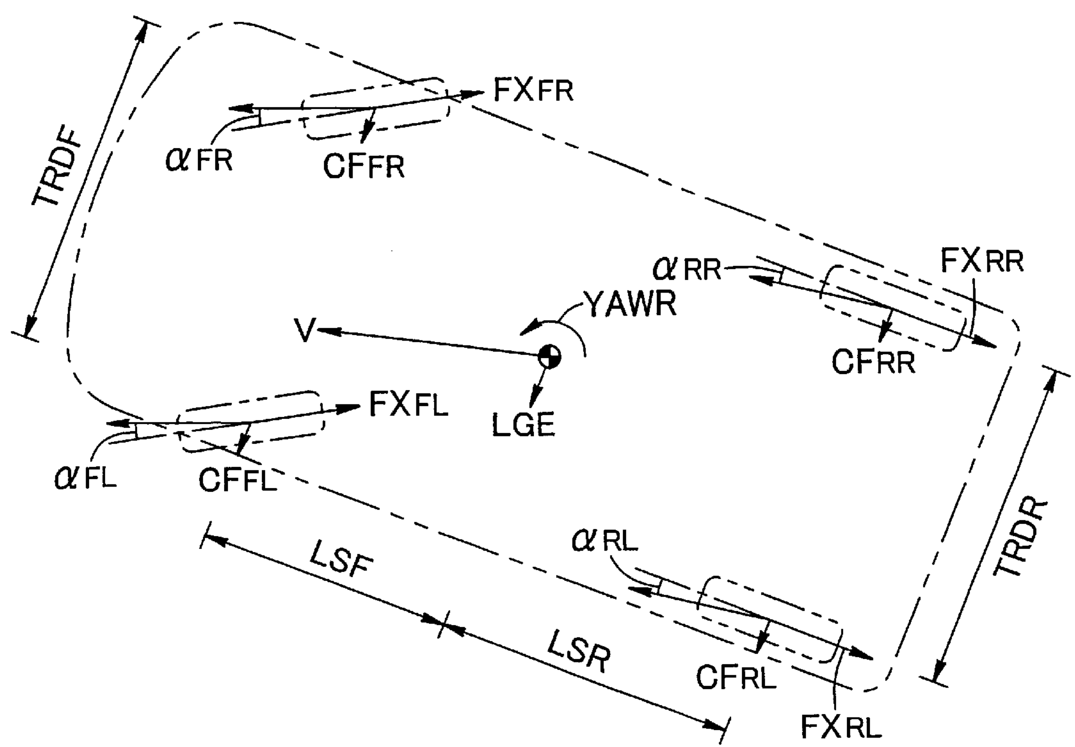
FIG. 3 is a diagram showing the definition of tire slip angles, tire lateral forces, vehicle body lateral acceleration, tire fore-and-aft forces and yawing motion of a vehicle turning a corner.

As shown in FIG. 3, the variables that are needed for this control during cornering include tire slip angles $\alpha_{FR}$, $\alpha_{FL}$, $\alpha_{RR}$ and $\alpha_{RL}$, tire lateral forces $CF_{FR}$, $CF_{FL}$, $CF_{RR}$ and $CF_{RL}$, a vehicle body lateral acceleration LGE, and tire fore-and-aft forces or brake/traction forces $FX_{FR}$, $FX_{FL}$, $FX_{RR}$ and $FX_{RL}$. A road frictional coefficient between the tire and road surface is necessary for determining a fore-and-aft acceleration FGE as well as the brake/traction forces and tire lateral forces.

The steering angle sensor 1 determines a steering angle STC, the wheel speed sensors 5*a*–5*d* determine the wheel speeds $VW_{FR}$, $VW_{FL}$, $VW_{RR}$ and $VW_{RL}$, the yaw rate sensor 2 determines the yaw rate YAWR, the lateral acceleration sensor 3 determines the vehicle body lateral acceleration LG, and the fore-and-aft acceleration sensor 4 determines the vehicle body fore-and-aft acceleration FG.

The steering angle STC is forwarded to an actual tire steering angle computing unit $STA_n$, and the actual tire steering angles $STA_R$ and $STA_L$ of the right and left front wheels are forwarded to a tire slip angle computing unit $\alpha_{mn}$. The wheel speeds $VW_{FR}$, $VW_{FL}$, $VW_{RR}$ and $VW_{RL}$ are forwarded to a tire slip ratio computing unit $SLP_{mn}$, the yaw rate YAWR is forwarded to an actual yaw rate increment computing unit ΔYRR, and the vehicle body accelerations LG and FR are forwarded to a wheel load computing unit $FZ_{mn}$.

In the illustrated embodiment, the wheel load computing unit $FZ_{mn}$ computes wheel loads $FZ_{FR}$, $FZ_{FL}$, $FZ_{RR}$ and $FZ_{RL}$ according to a dynamic tire model TM and the vehicle body accelerations LG and FR. The values produced from the wheel load computing unit $FZ_{mn}$ are forwarded to a tire lateral force (cornering force) computing unit $CF_{mn}$ and a tire fore-and-aft force computing unit $FX_{mn}$. Other methods may also be used for computing the wheel loads, for instance by actually measuring the vertical loads of the individual wheels.

The tire fore-and-aft force computing unit $FX_{mn}$ computes the brake/traction forces $FX_{FR}$, $FX_{FL}$, $FX_{RR}$ and $FX_{RL}$ of the individual wheels according to the wheel loads obtained from the wheel load computing unit $FZ_{mn}$, the tire slip ratios $SLP_{FR}$, $SLP_{FL}$, $SLP_{RR}$ and $SLP_{RL}$ of the individual wheels obtained from the tire slip ratio computing unit $SLP_{mn}$, and the road frictional coefficient $\mu$ which is computed by a road surface frictional coefficient computing unit $\mu$. The various values produced from the tire fore-and-aft force computing unit $FX_{mn}$ are forwarded to an estimated fore-and-aft acceleration computing unit FGE which then produces an estimated fore-and-aft acceleration FGE according to the brake/traction forces $FX_{FR}$, $FX_{FL}$, $FX_{RR}$ and $FX_{RL}$. The estimated fore-and-aft acceleration FGE is filtered by an estimated fore-and-aft acceleration filter FGEF. The filtered estimated fore-and-aft acceleration FGEF is then forwarded to the road surface frictional coefficient computing unit $\mu$.

The filtered estimated fore-and-aft acceleration FGEF is also forwarded to an estimated vehicle body speed (X-component) computing unit VVXβ which then computes an estimated vehicle body speed (X-component) VVXβ or a fore-and-aft speed of the vehicle body. The estimated vehicle body speed (X-component) VVXβ is then forwarded to a contact point speed (X-component) computing unit $VCX_{mn}$.

The contact point speed (X-component) computing unit $VCX_{mn}$ receives an estimated yaw rate CFYAWR from an estimated yaw rate computing unit CFYAWR which is described hereinafter in addition to the estimated vehicle body speed (X-component) VVXβ. The contact point speed (X-component) computing unit $VCX_{mn}$ produces contact point speeds (X-component) $VCX_{FR}$, $VCX_{FL}$, $VCX_{RR}$ and $VCX_{RL}$ as estimated fore-and-aft wheel speeds of the individual wheels. The contact point speeds (X-component) may correspond to the fore-and-aft vehicle body speed at the contact points of the individual wheels.

The estimated vehicle body speed (X-component) VVXβ and estimated yaw rate CFYAWR are also forwarded to a contact point speed (Y-component) computing unit $VCY_{mn}$ which additionally receives a vehicle body slip angle β from a vehicle body slip angle computing unit β, in addition to the estimated vehicle body speed (X-component) VVXβ and estimated yaw rate CFYAWR, to compute contact point speeds (Y-component) $VCY_{FR}$, $VCY_{FL}$, $VCY_{RR}$ and $VCY_{RL}$ as estimated lateral wheel speeds of the individual wheels. The contact point speeds (Y-component) may correspond to the lateral body speed at the contact points of the individual wheels.

The various values produced from the contact point speed (X-component) computing unit $VCX_{mn}$ are forwarded to the tire slip angle computing unit $\alpha_{mn}$ and a rolling direction speed computing unit $VC_{mn}$. The various values produced from the contact point speed (Y-component) computing unit $VCY_{mn}$ are also forwarded to the tire slip angle computing unit $\alpha_{mn}$ and rolling direction speed computing unit $VC_{mn}$. In the illustrated embodiment, the tire slip angles $\alpha_{FR}$, $\alpha_{FL}$, $\alpha_{RR}$ and $\alpha_{RL}$ of the individual wheels are computed according to the actual tire steering angle $STA_n$, contact point speeds (X-component) $VCX_{FR}$, $VCX_{FL}$, $VCX_{RR}$ and $VCX_{RL}$, and contact point speeds (Y-component) $VCY_{FR}$, $VCY_{FL}$, $VCY_{RR}$ and $VCY_{RL}$ of the individual wheels, and are forwarded to the tire cornering force computing unit $FY_{mn}$ and rolling direction speed computing unit $VC_{mn}$. The tire slip angles may also be determined by using other methods.

The rolling direction speed computing unit $VC_{mn}$ computes rolling direction speeds $VC_{FR}$, $VC_{FL}$, $VC_{RR}$ and $VC_{RL}$ of the individual wheels according to the tire slip angles obtained from the tire slip angle computing unit $\alpha_{mn}$ and the values obtained from the contact point speed (X-component) computing unit $VCX_{mn}$ and contact point speed (Y-component) computing unit $VCY_{mn}$. In the illustrated embodiment, the various values produced from the rolling direction speed computing unit $VC_{mn}$ are forwarded to the slip ratio computing unit $SLP_{mn}$ which then computes the slip ratios $SLP_{FR}$, $SLP_{FL}$, $SLP_{RR}$ and $SLP_{RL}$ of the individual wheels according to the rolling direction speeds $VC_{FR}$, $VC_{FL}$, $VC_{RR}$ and $VC_{RL}$ and wheel speeds $VW_{FR}$, $VW_{FL}$, $VW_{RR}$ and $VW_{RL}$. The slip ratios may also be determined by using other methods.

The tire slip angles obtained from the tire slip angle computing unit $\alpha_{mn}$ are also supplied to the cornering force computing unit $FY_{mn}$ which computes the cornering forces $FY_{FR}$, $FY_{FL}$, $FY_{RR}$ and $FY_{RL}$ of the individual wheels according to the tire slip angles. The cornering forces that are produced from the cornering force computing unit $FY_{mn}$ are forwarded to the tire lateral force (cornering force) computing unit $CF_{mn}$.

The tire lateral force (cornering force) computing unit $CF_{mn}$ receives the slip ratios from the slip ratio computing unit $SLP_{mn}$, the wheel loads from the wheel load computing unit $FZ_{mn}$, and the road frictional coefficient $\mu$ from the road surface frictional coefficient computing unit $\mu$, in addition to the cornering forces, and computes the tire lateral forces $CF_{FR}$, $CF_{FL}$, $CF_{RR}$ and $CF_{RL}$ of the individual wheels according to these variables. The output from the tire lateral force (cornering force) computing unit $CF_{mn}$ is forwarded to an estimated lateral acceleration computing unit LGE. The estimated lateral acceleration computing unit LGE computes an estimated lateral acceleration LGE according to the tire lateral forces obtained from the tire lateral force (cornering force) computing unit $CF_{mn}$. The estimated lateral acceleration LGE is filtered by an estimated acceleration filter LGEF, and is then forwarded to the aforementioned road surface frictional coefficient computing unit $\mu$.

A tire grip force computing unit TGM computes a total grip force RTGM according to the vehicle body lateral acceleration LG and vehicle body fore-and-aft acceleration FG. The obtained total grip force RTGM, along with the outputs of the acceleration sensors LG and FG, is forwarded to the road surface frictional coefficient computing unit $\mu$. The total grip force RTGM is computed as a square root of the sum of the square of the vehicle body lateral acceleration LG and the square of the vehicle body fore-and-aft acceleration FG, or $\{(FG^2+LG^2)^{1/2}\}$.

The actual yaw rate increment computing unit ΔYRR computes an actual yaw rate increment ΔYRR according to the yaw rate sensor value YAWR, and the computed actual yaw rate increment ΔYRR is then forwarded to a front and rear wheel moment correction coefficient computing unit $CFK_X$. The front and rear wheel moment correction coefficient computing unit $CFK_X$ also receives the tire lateral forces from the tire lateral force computing unit $CF_{mn}$, in addition to the computed actual yaw rate increment ΔYRR, and computes a front and rear wheel moment correction coefficient CFK1 and CFK2 according to these variables. The front and rear wheel moment correction coefficients CFK1 and CFK2 are forwarded to an estimated yaw rate increment computing unit ΔYRE.

The estimated yaw rate increment computing unit ΔYRE receives the tire lateral forces from the tire lateral force computing unit $CF_{mn}$, in addition to the front and rear wheel moment correction coefficients CFK1 and CFK2, and computes an estimated yaw rate increment ΔYRE according to these variables. The estimated yaw rate increment ΔYRE is forwarded to an estimated yaw rate computing unit CFYAWR.

The estimated yaw rate computing unit CFYAWR computes an estimated yaw rate CFYAWR according to the estimated yaw rate increment ΔYRE. The estimated yaw rate CFYAWR is forwarded to the contact point speed (X-component) computing unit $VCX_{mn}$ and contact point speed (Y-component) computing unit $VCY_{mn}$ as well as to a vehicle body slip angle increment computing unit Δβ.

An estimated vehicle body speed computing unit VVβ computes an estimated vehicle body speed VVβ according to the estimated vehicle body speed (X-component) VVXβ and vehicle body slip angle β. The estimated vehicle body speed VVβ, estimated yaw rate CFYAWR and filtered estimated acceleration LGEF are forwarded to the vehicle body slip angle increment computing unit Δβ. According to these values, the vehicle body slip angle increment computing unit Δβ computes a vehicle body slip angle increment Δβ. The vehicle body slip angle computing unit β then computes a vehicle body slip angle β according to the vehicle body slip angle increment Δβ. The vehicle body slip angle may also be determined by using other methods.

Figure 4:
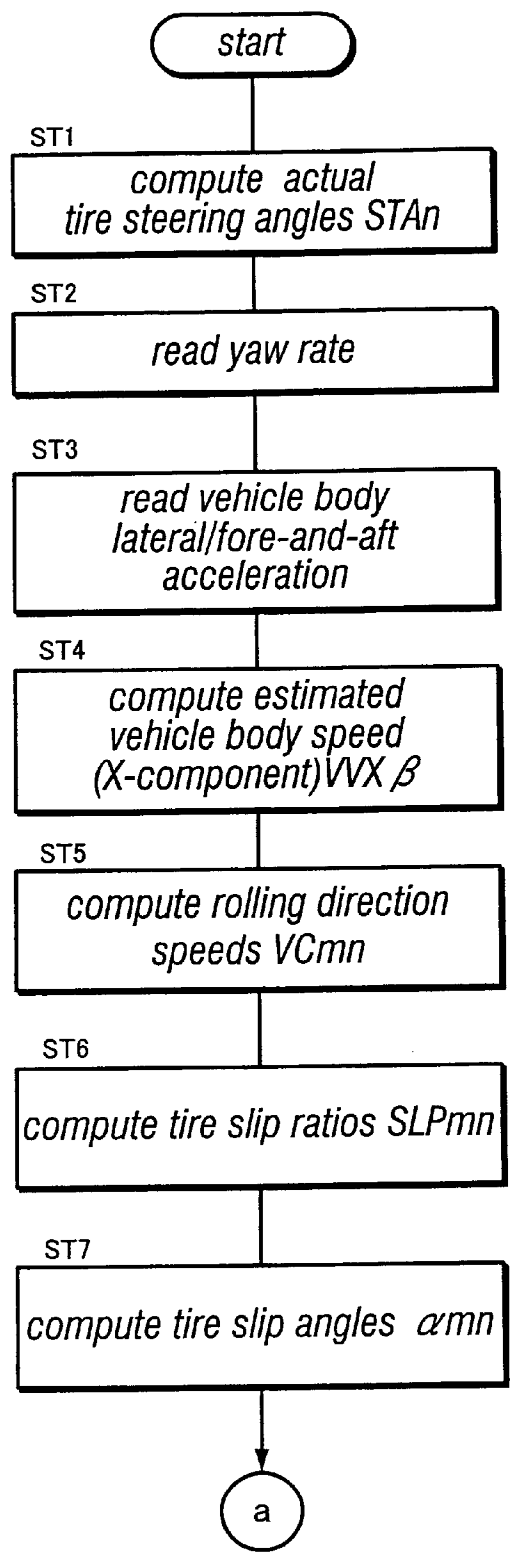
FIG. 4 is a first part of a general flow chart of the control process in the vehicle motion control system.

The control process which is executed in this control unit is now described in the following with reference to the flow chart of FIG. 4.

In step ST1, the actual tire steering angle computing unit $STA_n$ receives a steering angle STC from the steering sensor, and determines the actual tire steering angles $STA_R$ and $STA_L$ by taking into account various design parameters such as the gear ratio of the steering gear box. In step ST2, a yaw rate YAWR is read out from the yaw rate sensor YAWR. In step ST3, a vehicle body lateral acceleration LG and vehicle body fore-and-aft acceleration FG are read out from the acceleration sensors LG and FG before the control flow advances to step ST4.

In step ST4, the estimated vehicle body speed computing unit VVβ computes an estimated vehicle body speed (X-component) VVXβ. The computation of the estimated vehicle body speed (X-component) VVXβ may be carried out as shown in the flow chart shown in FIG. 5.

Figure 5:
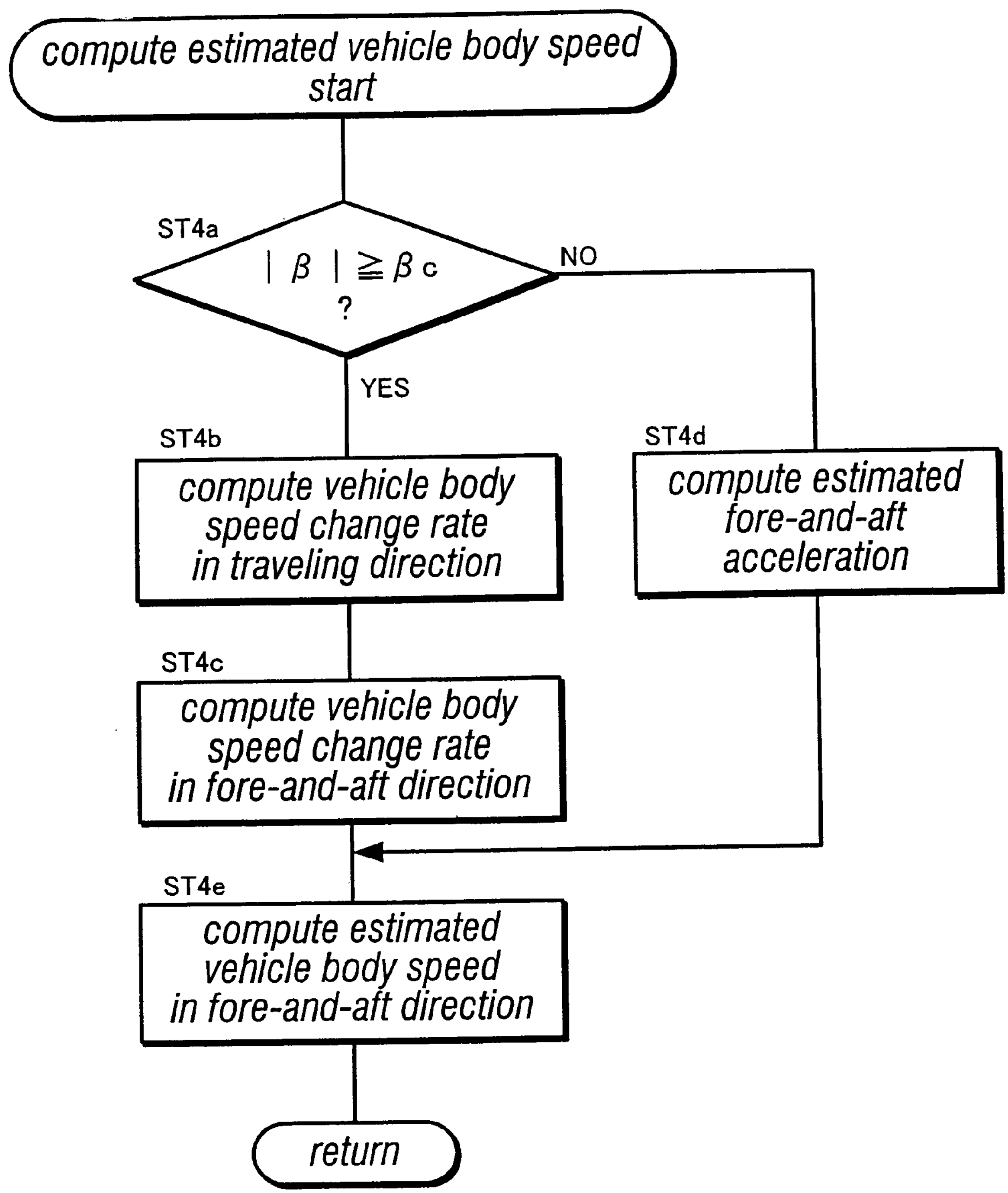
FIG. 5 is a subroutine flow chart for computing the estimated vehicle body speed.

Referring to FIG. 5, in step ST4*a*, it is determined if the absolute value of the vehicle body slip angle (side slip angle) β is greater than a threshold value $\beta_c$. If it is the case ($|\beta| \geqq \beta_c$), the program flow advances to step ST4*b* where a vehicle body speed change rate VVBG in the traveling direction is computed from the following equation.

$$VVBG=(FGEF \cos\beta+LGEF \sin\beta)\times KX \tag{1}$$

where KX is a predetermined coefficient which depends on design parameters of the vehicle.

In step ST4*c*, a vehicle body speed change rate VVBG in the fore-and-aft direction is computed from the following equation.

$$VVXBG=VVBG \cos\beta \tag{2}$$

If the absolute value of the vehicle body slip angle (side slip angle) β is smaller than the threshold value $\beta_c$ in step ST4*a*, the program flow advances to step ST4*d* where the predetermined coefficient KX is multiplied to the estimated fore-and-aft acceleration, or $$FGEF \times KX \quad (3)$$

In step ST4*e* which follows step ST4*c* or step ST4*d* as the case may be, the estimated vehicle body speed (X-component) VVXβ is obtained from the following equation $$VVX\beta(n) = VVX\beta(n-1) + VVXBG(n-1) \quad (4)$$

when step ST4*e* is reached via step ST4*c*, and from the following equation $$VVX\beta(n) = VVX\beta(n-1) + FGEF \times KX \quad (5)$$

when step ST4*e* is reached via step ST4*d*. Here, (n) indicates the current computation loop, and (n−1) indicates the previous computation loop.

The estimated vehicle body speed (X-component) VVXβ is thus computed by the subroutine steps ST4*a* to ST4*e* of step ST4 of the main routine, and the estimated vehicle body speed is determined in the estimated vehicle body speed (X-component) computing unit VVXβ.

Referring to FIG. 2, the estimated vehicle body speed (X-component) computing unit VVXβ and the vehicle body slip angle (side slip angle) β are forwarded to the estimated vehicle body speed computing unit VVβ. The estimated vehicle body speed (X-component) VVXβ is computed as described in connection with the subroutine flow described above (steps ST4*a* to ST4*e*). Therefore, when estimating the vehicle body speed VVβ, the values of the road surface frictional coefficient $\mu$, vehicle body slip angle (side slip angle) β, tire slip ratios $SLP_{mn}$, brake/traction forces $FX_{mn}$, estimated fore-and-aft acceleration FGE (FGEF), tire lateral forces $CF_{mn}$ and estimated lateral acceleration LGE (LGEF) are used, and the dynamic state of the vehicle, including the road condition, is represented by a vehicle model. Therefore, the estimated vehicle body speed can be determined accurately by eliminating the effects of the slippage of the tires during braking, road noises and an offset due to the inclination of the road that may be present when a fore-and-aft acceleration is used.

As a result, the vehicle body speed can be obtained highly accurately even when the vehicle is cornering and a substantial slippage of the tires is present, and the precision of the vehicle motion control based on the vehicle speed can be ensured. Once the estimated vehicle body speed (X-component) VVXβ is obtained, the program flow advances to step ST5.

In step ST5, the rolling direction speeds $VC_{FR}$, $VC_{FL}$, $VC_{RR}$ and $VC_{RL}$ of the various wheels are obtained as a basis for the speeds of the various tires. First of all, the contact point speed (X-component) computing unit $VCX_{mn}$ provides relevant information on the various tires according to the estimated vehicle body speed (X-component) VVXβ in combination with the estimated yaw rate CFYAWR. This allows the contact point speeds (X-component) $VCX_{FR}$, $VCX_{FL}$, $VCX_{RR}$ and $VCX_{RL}$ to be determined individually for the different tires. Likewise, the contact point speed (Y-component) computing unit $VCY_{mn}$ allows the contact point speeds (Y-component) $VCY_{FR}$, $VCY_{FL}$, $VCY_{RR}$ and $VCY_{RL}$ to be determined individually for the different tires according to the estimated vehicle body speed (X-component) VVXβ and estimated yaw rate CFYAWR in combination with the vehicle body slip angle β. Therefore, when the vehicle body slip angle β is zero, the contact point speeds (Y-component) are zero.

Because the contact point speed (X-component) and contact point speed (Y-component) are X and Y components of the contact point speed in the rolling direction of reach tire, the contact point speed (X-component) computing unit $VCX_{mn}$ and contact point speed (Y-component) computing unit $VCY_{mn}$ jointly form a contact point direction speed (X- and Y-components) computing unit. The contact point rolling direction speed computing unit $VC_{mn}$ computes the rolling direction speeds $VC_{FR}$, $VC_{FL}$, $VC_{RR}$ and $VC_{RL}$ of the individual wheels according to the contact point speeds (X-component) $VCX_{mn}$ and contact point speeds (Y-component) $VCY_{mn}$.

In step ST6, the tire slip ratios $SLP_{mn}$ of the individual wheels are obtained. This computation may be based on either the rolling direction speeds $VC_{mn}$ or wheel speeds $VW_{mn}$. When the computation is based on the rolling direction speeds $VC_{mn}$, $SLP_{mn}$ is determined as given by the following equation.

$$SLP_{mn} = 100 \times (VC_{mn} - VW_{mn}) / VC_{mn} \quad (6)$$

When the computation is based on the wheel speeds $VW_{mn}$, $SLP_{mn}$ is determined as given by the following equation.

$$SLP_{mn} = 100 \times (VC_{mn} - VW_{mn}) / VW_{mn} \quad (7)$$

In step ST7, the tire (lateral) slip angles $\alpha_{mn}$ are obtained from the contact point speeds (X-component) $VCX_{mn}$ and contact point speeds (Y-component) $VCY_{mn}$ before the program flow advances to step ST8 shown in FIG. 6.

Figure 7:
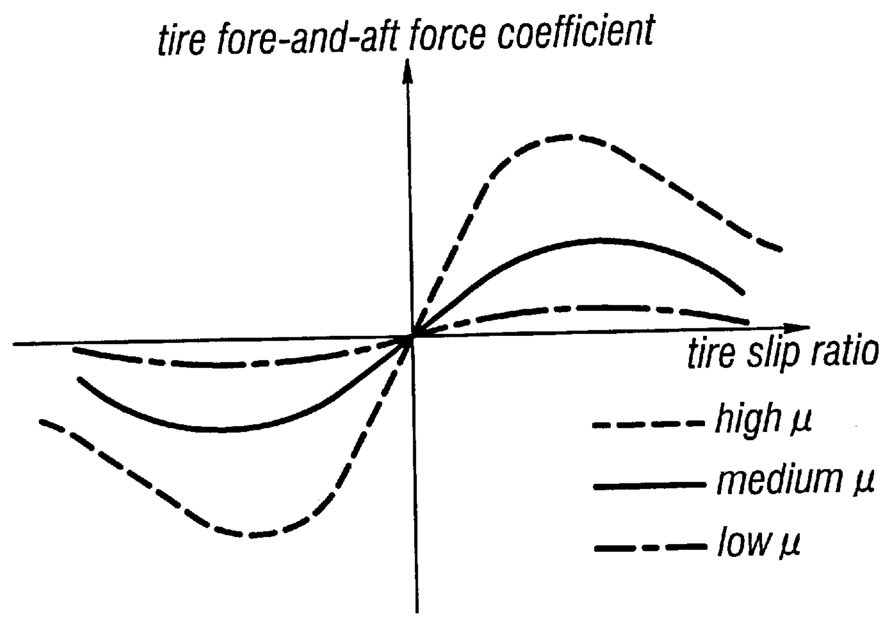
FIG. 7 is a graph representing the map for obtaining the tire fore-and-aft force coefficient.

In step ST8, the brake/traction forces (tire fore-and-aft forces) $FX_{mn}$ are computed according to the wheel loads $FZ_{mn}$, tire slip ratios $SLP_{mn}$ and road surface frictional coefficient $\mu$ that are forwarded to the tire fore-and-aft forces computing unit $FX_{mn}$. To simplify the computation, as shown in FIG. 7, the road surface frictional coefficient $\mu$ may be classified into three levels (high, medium and low) and a corresponding lookup table based on such a classification of the road surface frictional coefficient $\mu$ may be prepared so as to allow brake/traction force (tire fore-and-aft force) coefficients to be determined according to the corresponding tire slip ratios. By multiplying the brake/traction force (tire fore-and-aft force) coefficients, obtained from the table represented in FIG. 7, to the corresponding wheel loads, the brake/traction forces (tire fore-and-aft forces) for the individual wheels can be determined.

By using a three dimensional map taking into account the estimated road surface frictional coefficient as shown in FIG. 7, the estimation precision can be improved. The map preferably takes into account three or more levels of the road surface frictional coefficient.

In step ST9, the estimated fore-and-aft acceleration FGE is obtained from the brake/traction forces (tire fore-and-aft forces) $FX_{mn}$ computed in step ST8. The equation for this computation may be as given in the following.

$$FGE = (FX_{FR} + FX_{FL} + FX_{RR} + FX_{RL}) / (\text{total vehicle weight}) \quad (8)$$

In step ST10, the estimated fore-and-aft acceleration FGE is filtered by an estimated fore-and-aft acceleration filter FGEF. In this case, the estimated fore-and-aft acceleration FGE may be filtered simply by using a low pass filter.

In step ST11, the tire lateral forces $CF_{mn}$ of the individual wheels are computed according to the wheel loads $FZ_{mn}$, cornering forces $FY_{mn}$ and road surface frictional coefficient $\mu$, in addition to the tire slip ratios $SLP_{mn}$ that were obtained in step ST6. In this case also, to simplify the computation, as shown in FIG. 8, the road surface frictional coefficient $\mu$ may be classified into three levels (high, medium and low)

and a corresponding lookup table based on such a classification of the road surface frictional coefficient $\mu$ may be prepared so as to allow tire lateral force coefficients to be determined according to the corresponding tire slip angles. By multiplying the tire lateral force coefficients to the corresponding wheel loads, the tire lateral forces $CF_{mn}$ for the individual wheels when the tire slip ratio is zero can be determined.

Figure 8:
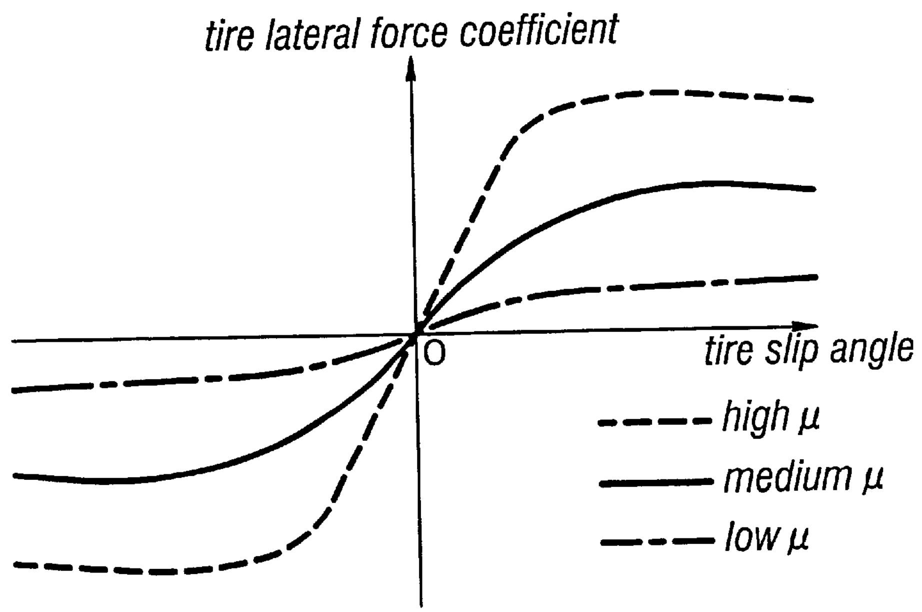
FIG. 8 is a graph representing the map for obtaining the tire lateral force coefficient.
Figure 9:
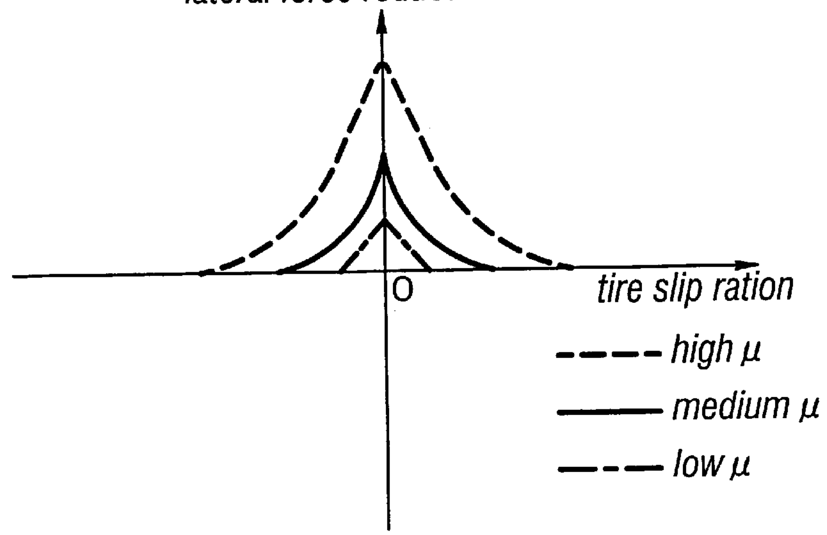
FIG. 9 is a graph representing the map for obtaining the tire lateral force reduction coefficient.

Tire lateral force reduction coefficients are then obtained from a lookup table as shown in FIG. 9 in which the tire lateral force reduction coefficient is given in relation to the tire slip ratio by classifying the estimated road surface frictional coefficient $\mu$ into three levels as was the case with the graphs of FIGS. 7 and 8. The tire lateral force reduction coefficient thus obtained according to the particular tire slip ratio from this three-dimensional graph for each wheel is then multiplied to the tire lateral force $CF_{mn}$ (for the case where the slip ratio is zero) to provide highly accurate values of the tire lateral forces $CF_{mn}$.

In step ST12, the estimated lateral acceleration LGE is obtained in the estimated lateral acceleration computing unit LGE from the following equation according to the tire lateral forces obtained from the tire lateral force computing unit $CF_{mn}$.

$$LGE=(CF_{FR}+CF_{FL}+CF_{RR}+CF_{RL})/(\text{total vehicle weight}) \quad (9)$$

Figure 10:
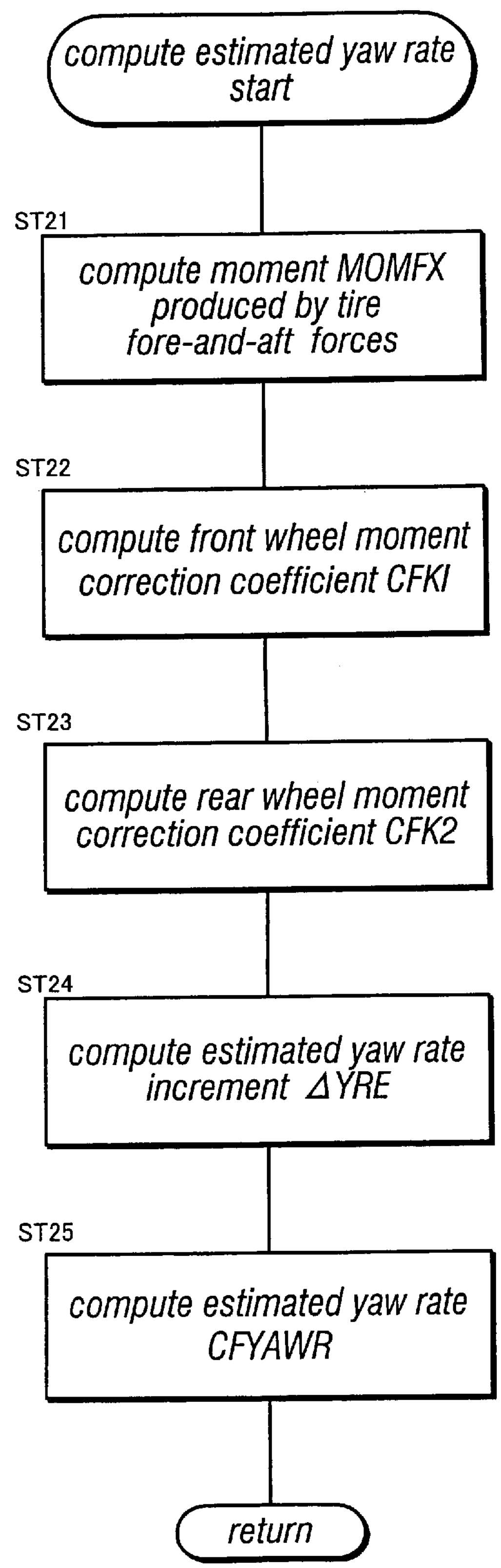
FIG. 10 is a subroutine flow chart for computing the estimated yaw rate.

The estimated yaw rate CFYAWR may be obtained between steps ST12 and ST13, and the subroutine for the computation of the estimated yaw rate CFYAWR is given in FIG. 10.

Referring to FIG. 10, in step ST21, the moment MOMFX produced by the fore-and-aft forces of the tires is computed, for instance, according to the following equation.

$$MOMFX=(FX_{FR}-FX_{FL})\times TRDF+(FX_{RR}-FX_{RL})\times TRDR \quad (10)$$

where TRDF and TRDR are the treads of the front and rear wheels, respectively (see FIG. 3).

In step ST22, the front wheel moment correction coefficient CFK1 based on MOMFX of Equation 10 is computed in a front and rear wheel moment (yaw rate correction coefficient) computing unit CFKx.

$$CFK1=\{LSR\times(CF_{FR}+CF_{FL}+CF_{RR}+CF_{RL})+(\Delta YRR/KDYR)+MOMFX\}/\{(LSF+LSR)/(CF_{FR}+CF_{FL})\} \quad (11)$$

where LSF is the distance between the gravitational center of the vehicle body and the front axle, LSR is the distance between the gravitational center of the vehicle body and the rear axle (see FIG. 3), and KDYR is a coefficient for converting the actual yaw rate increment ΔYRR into a moment.

In step ST23, the rear wheel moment correction coefficient CFK2 is computed in a similar fashion.

$$CFK2=\{LSF\times(CF_{FR}+CF_{FL}+CF_{RR}+CF_{RL})+(\Delta YRR/KDYR)+MOMFX\}/\{(LSF+LSR)/(CF_{RR}+CF_{RL})\} \quad (12)$$

In step ST24, the estimated yaw rate increment (estimated yaw moment) ΔYRE based on CFK1 and CFK2 obtained in the preceding steps is computed in an estimated yaw rate increment computing unit ΔYRE according to the following equation.

$$\Delta YRE=\{LSF\times CFK1\times(CF_{FR}+CF_{FL})-LSR\times CFK2\times(CF_{RR}+CF_{RL})-MOMFX\}\times KDYR \quad (13)$$

By integrating the estimated yaw rate increment (estimated yaw moment) ΔYRE, the estimated yaw rate (estimated vehicle body yaw rate) can be obtained.

In step ST25, the estimated yaw rate CFYAWR(n) of the current loop of the subroutine is computed in the estimated yaw rate computing unit CFYAWR according to the following equation.

$$CFYAWR(n)=CFYAWR(n-1)+\Delta YRE(n)\times Tr \quad (14)$$

where CFYAWR(n−1) is the estimated yaw rate that was obtained in the previous loop of the subroutine, and Tr is the loop time for this computation. By thus obtaining the estimated yaw rate CFYAWR, the accuracy of the yaw rate for the motion control, particularly when the vehicle is cornering, can be improved.

According to the conventional arrangement in which the yaw rate is obtained from the difference between the rotational speeds of the right and left wheels, because the yaw rate value disappears when a brake is applied, the yaw rate value is not available for the yaw moment control at such a time. According to the other conventional arrangement in which the yaw rate is obtained from the lateral forces and fore-and-aft forces of the tires, the accuracy of the estimated tire lateral forces tends to be impaired when the dynamic tire model for estimating the lateral forces and fore-and-aft forces of the tires does not correctly model the actual tires, particularly when there are disturbances from the road surface, and/or when there are errors in the vehicle body slip angle and/or estimated road surface frictional coefficient which are highly essential for the vehicle motion control. All these factors contribute to the reduction in the accuracy of the estimated yaw rate.

On the other hand, according to the foregoing embodiment, not only the yaw rate YAWR obtained from the yaw rate sensor YAWR is used but also the tire slip ratios $SLP_{mn}$, tire slip angles $\alpha_{mn}$ and road surface frictional coefficient $\mu$ are obtained, and the tire fore-and-aft forces $FX_{mn}$ are computed by using a corresponding dynamic tire model. Further, the front and wheel moment correction coefficients CFK1 and CFK2 are computed from the tire fore-and-aft forces $FX_{mn}$, tire lateral forces $FY_{mn}$ and yaw rate YAWR, and the estimated yaw rate CFYAWR is obtained from the estimated yaw moment ΔYRE computed from the tire fore-and-aft forces $FX_{mn}$, tire lateral forces $FY_{mn}$ and front and wheel moment correction coefficients CFK1 and CFK2. This allows the estimated yaw rate CFYAWR to accurately reflect the actual vehicle motion under all conditions, and the problems associated with the prior art such as the loss of accuracy in the estimated yaw rate can be eliminated.

Even when there are some errors in the estimation of the tire lateral forces $FY_{mn}$, for instance, due to the use of non-standard tires and disturbances from the road surfaces, the errors in the tire lateral forces $FY_{mn}$ and lateral acceleration LGE can be eliminated or minimized by using the front and wheel moment correction coefficients CFK1 and CFK2, and the adaptability of the dynamic tire model can be improved.

According to the prior art, the vehicle body slip angle (side slip angle) β can be obtained by computing the vehicle body slip angle increment from the lateral acceleration, vehicle body speed and yaw rate, and integrating the thus obtained vehicle body slip angle increment. However, according to such a conventional approach, when there is an offset in the zero point of the yaw rate sensor, because the vehicle body slip angle is obtained by integrating "vehicle body lateral acceleration/vehicle body speed-yaw rate", the offset is also integrated, and an excessive error is produced in the vehicle body slip angle.

On the other hand, according to the foregoing embodiment, instead of using the detected value of the yaw rate sensor, the vehicle body slip angle increment $\Delta\beta$ is obtained from the lateral acceleration LGE (LGEF), vehicle body speed $VV\beta$ and estimated yaw rate CFYAWR, and the vehicle body slip angle $\beta$ is obtained by adding the vehicle body slip angle increment $\Delta\beta$ to the previously obtained vehicle body slip angle $\beta(n-1)$. Thus, even when there is a significant offset in the zero point of the yaw rate sensor, the accuracy of the vehicle body slip angle $\beta$ can be ensured.

In the control process described above, the maps which take into account the road surface frictional coefficient were used for obtaining the tire fore-and-aft force coefficient, tire lateral force coefficient and tire lateral force reduction coefficient. In the foregoing embodiment, three possible levels were selected for the road surface frictional coefficient (high $\mu$, medium $\mu$ and low $\mu$). By thus preparing a plurality of tire models for the different levels of the road surface frictional coefficient, the cornering forces, vehicle body fore-and-aft forces (tire lateral and fore-and-aft forces) can be computed by fully taking into account the actual road surface frictional coefficient and other road surface conditions, and the vehicle body slip angle $\beta$ can be determined at a high precision. The estimated yaw rate CFYAWR can be thus used advantageously as the yaw rate for determining the state of the vehicle and executing the motion control of the vehicle.

Figure 11:
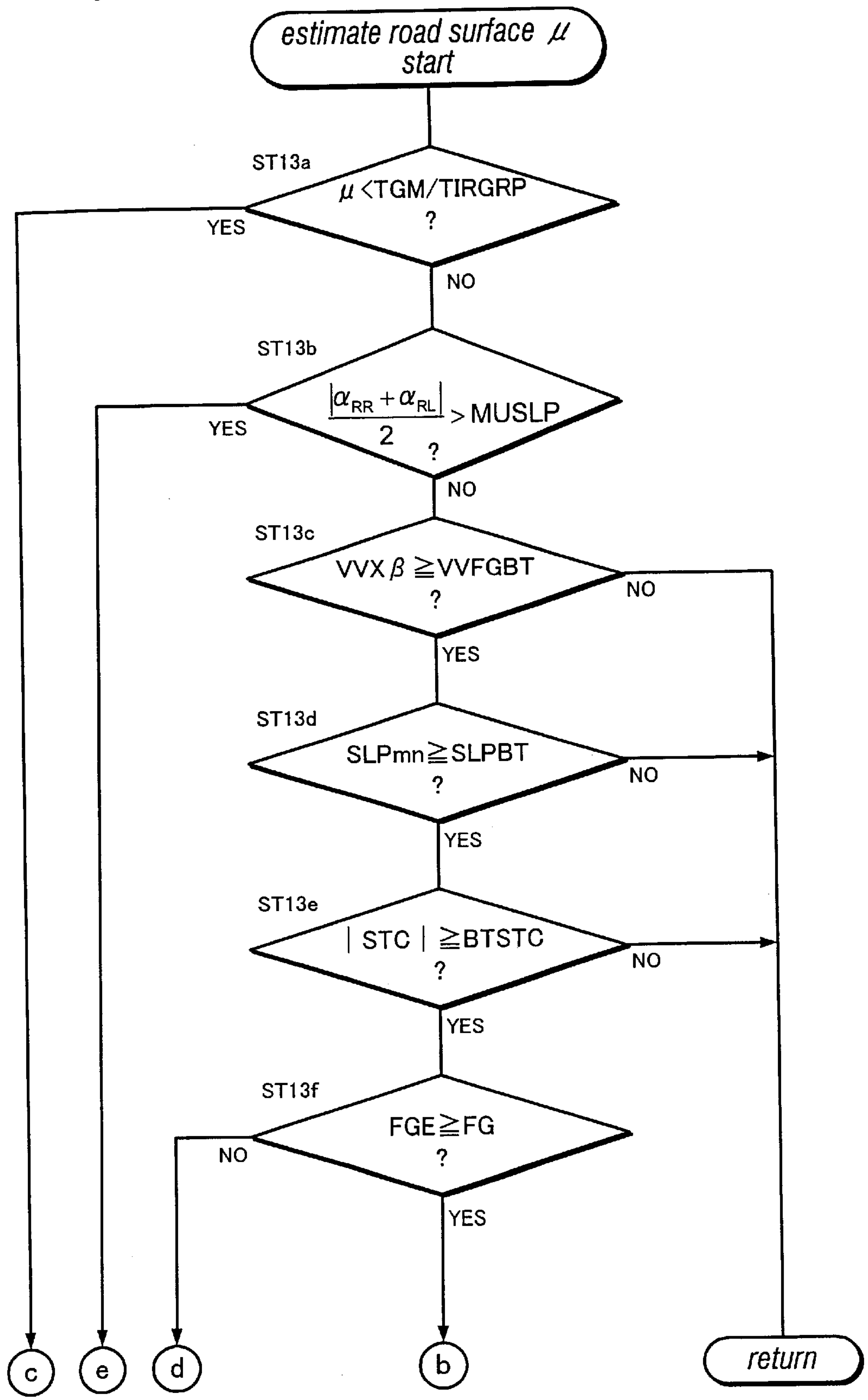
FIG. 11 is a first part of a subroutine flow chart for computing the road surface frictional coefficient.

In step ST13, the estimated road surface frictional coefficient $\mu$ is obtained. The estimated road surface frictional coefficient $\mu$ can be obtained from the filtered estimated lateral acceleration value LGEF, filtered estimated fore-and-aft acceleration value FGEF and total grip force TG according to the process flow depicted in the subroutine flow chart of FIG. 11. Referring to FIG. 11, in step ST13*a*, it is determined if the current estimated road surface frictional coefficient $\mu$ is smaller than the tire grip force converted value. The tire grip force converted value can be represented as a value (TGM/TIRGRP) associated with the total grip force TGM. Here, TIRGRP is a conversion coefficient for changing the dimension of the total grip force TGM to that of the road surface frictional coefficient. The initial value of the road surface frictional coefficient may be 1 which corresponds to a dry road surface.

If the current estimated road surface frictional coefficient $\mu$ is equal to or greater than the tire grip force converted value in step ST13*a*, the program flow advances to step 13*b* to start the process of estimating the road surface frictional coefficient. In step ST13*b*, it is determined if the averaged value of the tire slip angles $\alpha_{RR}$ and $\alpha_{RL}$ of the rear wheels is greater than a threshold value MUSLP. In the drawing, these values are given as absolute values because the tire slip angle is either a negative or positive value depending on the direction of the angle with respect to the neutral direction. When the average value of the tire slip angles of the rear wheels is greater than the threshold value, the road surface frictional coefficient is obtained with respect to a lateral movement. Conversely, when the average value of the tire slip angles of the rear wheels is equal to or smaller than the threshold value, the program flow advances to step ST13*c*, and the road surface frictional coefficient is obtained with respect to a fore-and-aft movement.

In steps ST13*c* to 13*e*, it is determined if all the conditions including the vehicle speed, tire slip ratios and steering angle that are required for the computation of the road surface frictional coefficient with respect to a fore-and-aft movement are all met.

In step ST13*c*, it is determined if the estimated vehicle body speed (X-component) $VVX\beta$ is equal to or greater than a threshold value VVFGBT. If it is the case, the program flow advances to step ST13*d*. Otherwise, the current loop of the subroutine flow is terminated. In step ST13*d*, it is determined if the slip ratio $SLP_{mn}$ of at least one of the wheels is equal to or greater than a threshold value SLPBT. If it is the case, the program flow advances to step ST13*e*. Otherwise, the current loop of the subroutine flow is terminated. In step ST13*d*, it is determined if the absolute value of the steering angle STC is equal to or greater than a threshold value BTSTC. If it is the case, the program flow advances to step ST13*f*. Otherwise, the current loop of the subroutine flow is terminated.

In step ST13*f*, it is determined if the estimated fore-and-aft acceleration FGE is equal to or greater than the vehicle body fore-and-aft acceleration FG obtained from the acceleration sensor. If it is the case, the program flow advances to step ST13*g* shown in FIG. 12 to decrease the road surface frictional coefficient by one notch. Otherwise, the program flow advances to the steps for increasing the road surface frictional coefficient by one notch. The road surface frictional coefficient can be thus obtained, but may also be obtained in different ways without departing from the spirit of the present invention.

Figure 12:
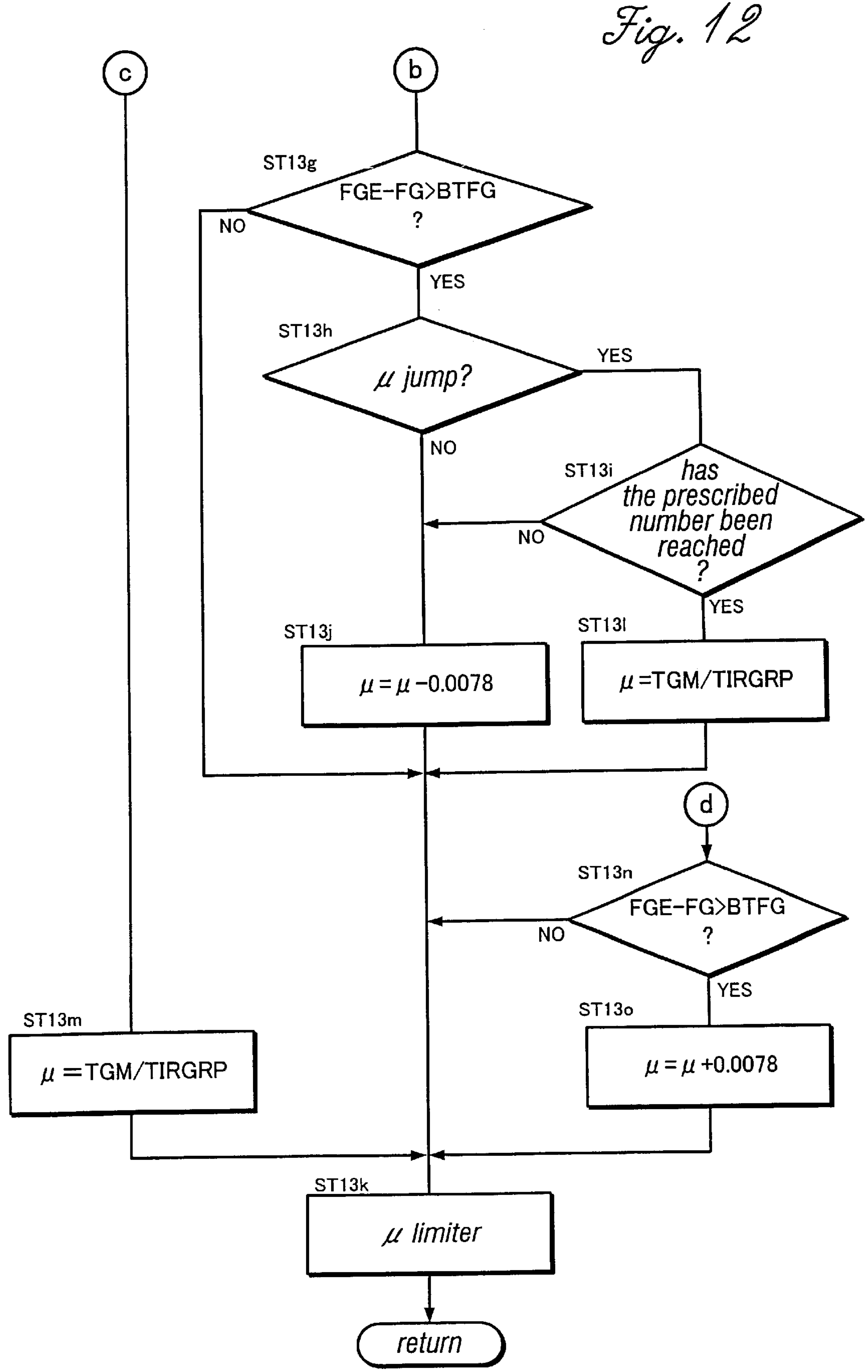
FIG. 12 is a second part of the subroutine flow chart for computing the road surface frictional coefficient.

Referring to FIG. 12, in step ST13*g*, it is determined if the value obtained by subtracting the vehicle body fore-and-aft acceleration FG obtained from the sensor from the estimated fore-and-aft acceleration FGE is greater than a threshold value BTFG. If it is the case, the program flow advances to step ST13*h* where it is determined if the state of exceeding the threshold value BTFG has persisted for more than a prescribed time period. If it is the case, it is determined as a case of $\mu$ jump (a case involving a large change in the road surface frictional coefficient), and the program flow advances to step ST13*i*. If there is no $\mu$ jump, the program flow advances to step ST13*j*.

In step ST 13*j*, a certain value such as 0.0078 is subtracted from the current road surface frictional coefficient $\mu$ to lower the estimated road surface frictional coefficient $\mu$ before the program flow advances to step ST13*k*. In step ST13*k*, a limiter process is executed with respect to the upper and lower limits so that the estimated road surface frictional coefficient $\mu$ may be kept within a prescribed range and prevented from reaching an unrealistic value before the current loop of the subroutine flow is terminated.

In step ST13*i*, it is determined if a case of $\mu$ jump has been detected in step ST13*h* for more than a prescribed number of times. The program then advances to step ST13*l* if a $\mu$ jump has occurred for more than the prescribed number of times, and to step ST13*j* if not. In step ST13*l*, the tire grip force conversion value (TGM/TIRGRP) is substituted into the estimated road surface frictional coefficient $\mu$ before the program flow advances to step ST13*k*. If the value obtained by subtracting the vehicle body fore-and-aft acceleration FG obtained from the sensor from the estimated fore-and-aft acceleration FGE is equal to or smaller than the threshold value BTFG in step ST13*g*, the program flow also advances to step ST13*k*.

If the current estimated road surface frictional coefficient $\mu$ is found to be smaller than the tire grip force conversion value in step ST13*a*, the program flow advances to step ST13*m*. In step ST13*m*, the estimated road surface frictional coefficient $\mu$ is set as the tire grip force conversion value (TGM/TIRGRP) before the program flow advances to step ST13*k*.

If the estimated fore-and-aft acceleration value FGE is determined to be less than the vehicle body fore-and-aft acceleration FG detected by the sensor in step ST13*f*, the program flow advances to step ST13*n* shown in FIG. 12. In step ST13*n*, it is determined if the value obtained by subtracting the vehicle body fore-and-aft acceleration FG obtained from the sensor from the estimated fore-and-aft acceleration FGE is equal to or smaller than the threshold value BTFG. If this value is equal to or smaller than the threshold value BTFG, the program flow advances to step ST13*k* and otherwise to step ST13*o*. In step ST 13*o*, a certain value such as 0.0078 is added to the current estimated road surface frictional coefficient $\mu$ to raise the estimated road surface frictional coefficient $\mu$ by one notch before the program flow advances to step ST13*k*.

Figure 13:
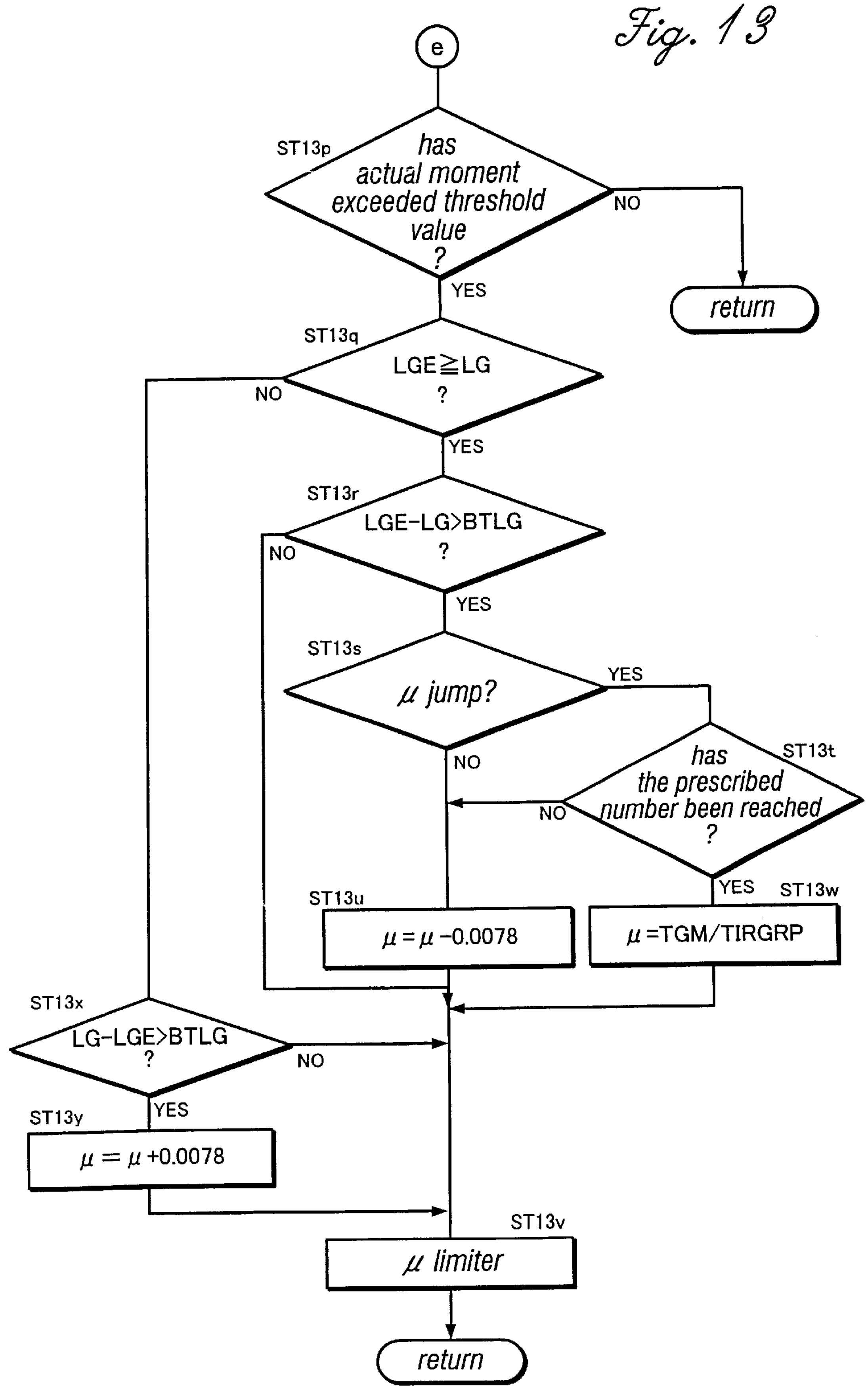
FIG. 13 is a third part of the subroutine flow chart for computing the road surface frictional coefficient.

In step ST13*b*, if the average value of the tire slip angles of the rear wheels is determined to be large, and the road surface frictional coefficient is therefore to be estimated with respect to a lateral movement, the program flow advances to step ST13*p* shown in FIG. 13. In step ST13*p*, it is determined if the actual yaw moment has exceeded a threshold value. Although this determination process is not shown in FIG. 2, it can be accomplished by forwarding the yaw rate YAWR detected by the yaw rate sensor 2 to the road surface frictional coefficient computing unit $\mu$, and executing a corresponding process in this unit. If the actual yaw moment is equal to or less than the threshold value, the current loop of the subroutine flow is terminated.

If it is determine that the actual yaw moment has exceeded the threshold value in step ST13*p*, the program flow advances to step ST13*q*. In step ST13*q*, it is determined if the estimated lateral acceleration LGE (LGEF) is equal to or grater than the vehicle body lateral deceleration LG detected by the sensor. If it is the case, the program flow advances to step ST13*r* to lower the estimated road surface frictional coefficient $\mu$. Otherwise, the program flow advances to the steps for raising the estimated road surface frictional coefficient $\mu$.

In step ST13*r*, it is determined if a value obtained by subtracting the vehicle body fore-and-aft acceleration LG obtained from the sensor from the estimated lateral acceleration LGE is greater than the threshold value BTLG. If it is the case, the program flow advances to step ST13*s*.

In step ST13*s*, it is determined if the state of exceeding the threshold value as determined in step ST13*r* has persisted for more than a prescribed period of time. If it is the case, the program flow advances to step ST13*t* as a case of a $\mu$ jump. Otherwise, the program flow advances to step ST13*u*.

In step ST13*u*, a certain value such as 0.0078 is subtracted from the current road surface frictional coefficient $\mu$ to lower the estimated road surface frictional coefficient $\mu$ before the program flow advances to step ST13*v*. In step ST13*v*, a limiter process is executed with respect to the upper and lower limits so that the estimated road surface frictional coefficient $\mu$ may be kept within a prescribed range and prevented from reaching an unrealistic value before the current loop of the subroutine flow is terminated.

In step ST13*t*, it is determined if a case of $\mu$ jump has been detected in step ST13*s* for more than a prescribed number of times. The program then advances to step ST13*w* if a $\mu$ jump has occurred for more than the prescribed number of times, and to step ST13*u* if not. In step ST13*w*, the tire grip force conversion value (TGM/TIRGRP) is substituted into the estimated road surface frictional coefficient $\mu$ before the program flow advances to step ST13*v*. If the value obtained by subtracting the vehicle body lateral acceleration LG obtained from the sensor from the estimated lateral acceleration sensor LGE is equal to or smaller than the threshold value BTLG in step ST13*r*, the program flow also advances to step ST13*v*.

If the estimated lateral acceleration value LGE (LGEF) is determined to be less than the vehicle body lateral acceleration LG detected by the sensor in step ST13*q*, the program flow advances to step ST13*x*. In step ST13*x*, it is determined if the value obtained by subtracting the vehicle body lateral acceleration LG obtained from the sensor from the estimated lateral acceleration LGE (LGEF) has exceeded the threshold value BTLG. If the threshold value has been exceeded, the program flow advances to step ST13*y* where a certain value such as 0.0078 is added to the current estimated road surface frictional coefficient $\mu$ to raise the estimated road surface frictional coefficient $\mu$ by one notch before the program flow advances to step ST13*v*.

By thus obtaining the estimated road surface frictional coefficient $\mu$, the accuracy of the road surface frictional coefficient $\mu$ can be improved. According to the prior art, the road surface frictional coefficient $\mu$ tended to be estimated higher than it actually is when the estimation relied only on the tire slip ratios $SLP_{mn}$ and the tire slip ratios are relatively small as is the case on snow covered roads or frozen roads. However, the logic of obtaining the estimated road surface frictional coefficient $\mu$ which is described above is free from such problems.

More specifically, according to the embodiment described above, the estimation can be carried out by using the vehicle body fore-and-aft and lateral accelerations in such a manner as to fully take into account the fact that the vehicle is traveling straight or cornering. Also, by detecting a $\mu$ jump, the estimated road surface frictional coefficient $\mu$ is prevented from deviating significantly from the actual value, and a value which agrees with or close to the actual road surface frictional coefficient $\mu$ can be obtained at all times. Also, the fore-and-aft accelerations, lateral accelerations and yaw moment can be estimated from the tire data maps (FIGS. 7 and 8) for determining the tire slip angles $\alpha_{mn}$, tire lateral forces and tire fore-and-aft forces, and the estimated road surface frictional coefficient $\mu$ can be corrected or adjusted by comparing these estimated values with the values actually detected by the sensors (to effect the raising and lowering of $\mu$ which was described above). Based on the adjusted estimated road surface frictional coefficient $\mu$, the gains of the tire data maps can be adapted. In the illustrated embodiment, the tire data maps are adapted to three levels of the road surface frictional coefficient $\mu$.

Thus, the road surface frictional coefficient $\mu$ can be estimated at a high precision without regard to the condition of the vehicle, in particular without regard to if the vehicle is accelerating, decelerating, traveling straight or cornering. The precision of the road surface frictional coefficient $\mu$ can be as high as 0.05 if the precision of the tire slip angles $SLP_{mn}$ is in the order of 0.5 degrees.

In step ST14, the vehicle body slip angle increment (side slip angle increment) $\Delta\beta$ is computed in the vehicle body slip angle increment computing unit $\Delta\beta$ according to the following equation, $$\Delta\beta = KLGVXD \times (LGE/VV\beta) - CFYAWR \tag{15}$$

where KLGVXD is a coefficient for conforming the dimension of the quotient of the estimated lateral acceleration LGE (LGEF) to the estimated vehicle body speed VVβ to that of the estimated yaw rate CFYAWR. The vehicle body slip angle (side slip angle) β can be obtained by integrating the vehicle body slip angle increment (slide slip angle increment) Δβ.

In step ST15, the vehicle body slip angle (side slip angle) β is computed in the vehicle body slip angle (side slip angle) computing unit β according to the following equation.

$$\beta(n) = \beta(n-1) + \Delta\beta(n) \tag{16}$$

where (n) indicates the value computed in the current loop and (n−1) indicates the value computed in the previous loop. In other words, the vehicle body slip angle β is computed by adding the vehicle body slip angle increment Δβ obtained in step ST14 of the current loop to the vehicle body slip angle β(n−1) obtained in the previous loop.

The computation of the vehicle body slip angle β described above is based on a tire model which yields the tire fore-and-aft forces and tire lateral forces by fully taking into account the different levels (high, medium and low) of the road surface frictional coefficient, and can produce the vehicle body slip angle β at a high precision by minimizing the errors in the estimated values of the tire lateral forces and tire fore-and-aft forces (brake/traction forces).

The control system having the structure described above can perform a control action which provides both a high stability and a favorable steerability. As an example of such a control action, the control process in cases of oversteer and understeer is described in the following.

According to a conventional arrangement, a control variable is obtained from the values of the steering angle and yaw rate that are detected by using sensors, and the moment of the vehicle body is controlled by selectively activating the brakes of the different wheels in appropriate manners in cases of oversteer and understeer. More specifically, the control variable is given as a deviation of the yaw rate as detected by a yaw rate sensor from a standard yaw rate determined from the steering angle, and the vehicle body moment is controlled in such a manner that the outer wheels are braked in case of understeer and the inner wheels are braked in case of oversteer. However, according to such a yaw rate control, because the road grip conditions of the four wheels are not directly monitored, the yaw moment may be controlled, but it does not mean that the travel path of the vehicle is controlled. For instance, the travel path of the vehicle may swerve outward while the vehicle turns a corner (drift out).

On the other hand, according to the control system of the present invention described above, the estimated vehicle body speed VVβ, road surface frictional coefficient $\mu$, vehicle body slip angle β and tire slip angles $\alpha_{mn}$ are estimated, and the two rear wheels and outer front wheel are braked in a controlled manner in dependence on the vehicle body slip angle β in the case of oversteer while the two rear wheels are braked in a controlled manner in case of understeer in dependence on the degree of understeer. By thus controlling the vehicle body moment and reducing the kinetic energy of the vehicle, undesired motions of the vehicle such as a drift out can be avoided.

An exemplary control process at the time of oversteer/understeer is described in the following with reference to the flow charts of FIGS. 14 to 16 and the control logic block diagram of FIG. 17. Referring to FIG. 14, in step ST31, it is determined if the momentum reduction control is in progress. As the control process at the time of oversteer/understeer requires at least the two rear wheels to be braked, it is desirable to determine if the rear wheels are being braked. If it is not the case, the program flow advances to step ST32 to start this control process. If the rear wheels are being braked, the program flow advances to step ST33 to execute the process of terminating the momentum reduction control.

In step ST32, as a condition for starting the momentum reduction control, it is determined if the estimated vehicle body speed VVβ is equal to or greater than a threshold value VVALST (20 km/h, for instance). If it is the case, the program flow advances to step ST34 to determine if there is a slippage exceeding a prescribed level existing for each of the wheels. In step ST34, it is determined if the absolute value of the tire slip angle $\alpha_{Rn}$ of either one of the rear wheels is equal to or greater than a threshold value ALFIN. If it is the case, the program flow advances to step ST35.

The condition for starting the momentum reduction control is determined from the vehicle speed and the tire slip angles of the rear wheels. If the variable is below the corresponding threshold value in step ST32 or ST33, the current loop of the subroutine is terminated.

In step ST35, the basic target rear wheel speeds $VI_{Rn}$ are that are required for the momentum reduction control of the vehicle are computed. Referring to FIG. 17, the basic target rear wheel speeds $VI_{Rn}$ are computed by computing a target wheel speed modification ratio RUDVR from the standard yaw rate MYRNO obtained from the steering angle STC and yaw rate YAWR, computing the rolling direction speeds $VC_{mn}$ from the estimated vehicle body speed (X-component) VVXβ, and then computing the basic target rear wheel speeds $VI_{Rn}$ from the target wheel speed modification ratio RUDVR and rolling direction speeds $VC_{mn}$.

In step ST33, it is determined if the vehicle speed condition is met by comparing the vehicle speed with a threshold vehicle speed (10 km/h, for instance) that can be safely considered as a substantially stationary state. If the vehicle is in a substantially stationary state, the current loop of the subroutine is terminated as a case of the vehicle speed condition having been met for terminating the momentum reduction control. Otherwise, the program flow advances to step ST36 as case of the vehicle speed condition not having been met. In other words, the vehicle momentum control is continued only if the momentum of the vehicle is not insignificant.

In step ST36, the vehicle body slip angle condition is evaluated by comparing the vehicle body slip angle with a threshold value. If the vehicle body slip angle is equal to or greater than a threshold value, the program flow advances to step ST37. In other words, if the vehicle body slip angle becomes excessive during the rear wheel control, the momentum control is terminated so as to prevent the vehicle motion to become unstable (oversteer or spin).

In step ST37, it is determined if the tire slip angle condition is met by comparing the tire slip angle with a threshold value. If the tire slip angle is equal to or greater than the threshold value (which indicates the regaining of the stable condition), the program flow advances to step ST38. In step ST38, it is determined if the lateral acceleration condition is met by comparing the lateral acceleration with a threshold value. If the lateral acceleration is equal to or greater than the threshold value (which indicates the regaining of the stable condition), the program flow advances to step ST39. Otherwise, the program flow advances to step ST35 to continue the ongoing momentum reduction control. If the vehicle body slip angle condition is met in step ST36, or if the tire slip angle condition is met in step ST37, the program flow advances to step ST39.

In step ST39, it is determined if a delay time (200 ms, for instance), by elapsing of which indicates that the momentum reduction control may be terminated, has expired. If the delay time has not expired, the program flow advances to step ST35 to continue the ongoing momentum reduction control. Otherwise, the current loop of the subroutine is terminated. Thus, the vehicle momentum control is continued as long as a certain condition is met, and would not be terminated in a short period of time once it is started.

If the program flow has advanced to step ST35, it is determined in the following step ST40 if it is a case of oversteer or understeer. This determination step may be based on the deviation between the standard yaw rate MYRNO and yaw rate YAWR, and is executed in the target wheel speed modification ratio computing unit RUDVR (O/U). Depending on the output of the target wheel speed modification ratio computing unit RUDVR which serves as means for detecting oversteer and understeer, the program flow advances to step ST41 in case of understeer or ST42 in case of oversteer.

In step ST41, the target vehicle speed modification decrement (the target vehicle speed modification ratio RUDVR) which is computed in dependence on the degree of understeer is subtracted from the reference target wheel speeds (rolling direction speeds $VC_{mn}$) to yield the control target wheel speeds (vehicle momentum reduction control target vehicle speeds) $VI_{Rn}$. In step ST43 (see FIG. 15), the target control variable ($VE_{RR}/VE_{RL}$) for the inner wheel is computed from the deviation of the corresponding wheel speed ($VW_{RR}/VW_{RL}$) from the control target wheel speed $VI_{Rn}$. Likewise, in step ST44, the target control variable for the outer wheel is computed from the deviation ($VE_{RR}/VE_{RL}$) of the corresponding wheel speed ($VW_{RR}/VW_{RL}$) from the control target wheel speed $VI_{Rn}$.

The limiter value ILIN for the inner side is obtained from the tire lateral forces $CF_{mn}$, tire fore-and-aft forces $FX_{mn}$ and road surface frictional coefficient $\mu$ in step ST45 (see FIG. 17), and the limiter value ILOUT for the outer side is similarly obtained in step ST46.

When the program flow had advanced to step ST42 as a case of oversteer, the wheel control variables (target control variables) are computed in this step. The reference target wheel speeds (rolling direction speed $VC_{mn}$) are set as the control target wheel speeds (vehicle momentum reduction control target vehicle speeds) $VI_{Rn}$, and the target control variable ($VE_{RR}/VE_{RL}$) for each of the right and left rear wheels is computed from the deviation of the corresponding control target wheel speed $VI_{Rn}$ from the detected wheel speed of the corresponding rear wheel ($VW_{RR}/VW_{RL}$).

In step ST47, the limiter value ILTOT is obtained similarly as in the case of the understeer, and the program flow advances to step ST48. The program flow also advances from step ST46 to step ST48.

In step ST48, the upper limit of the rear wheel control variable is set by using the limiter value computed in step ST46 or ST47, and the rear wheel control variable (vehicle momentum reduction control variable) $IT_{Rn}$ which is limited within a prescribed range is obtained.

Step ST49 starts the process of computing a control variable by which the moment control based on the moment obtained from the vehicle body slip angle β is restricted, in case of oversteer.

In step ST49, it is determined if the moment (vehicle body slip angle) control is in progress. It can be determined from the magnitude of the vehicle body slip angle β. If not, the program flow advances to step ST50 to determine if the condition to start the moment control is met. In step ST49, if the moment control is in progress, the program flow advances to step ST51 to start the process of determining if the condition to terminate the moment control is met.

In step ST50, it is determined if the process of estimating the steering angle STC has completed. If this estimation process has completed, the program flow advances to step ST52. Otherwise, the process of determining if the condition to start the moment control is met is terminated. In step ST52, it is determined if the estimated vehicle body speed VVβ is equal to or greater than a threshold value VVALST (20 km/h, for instance). If it is the case, the program flow advances to step ST53. In step ST53, it is determined if the tire slip angles $\alpha_{Rn}$ meet the condition for terminating the moment control. This condition is met when the absolute value of the tire slip angles $\alpha_{Rn}$ is equal to or greater than a threshold value ROTIN1 and the tire slip angle change rate Dα (degrees/sec) is equal to or greater than a threshold value DROTIN, or when the absolute value of the tire slip angles $\alpha_{Rn}$ is equal to or greater than a threshold value ROTIN2. If this condition is met, the program flow then advances to step ST54 (see FIG. 16).

In step ST54, it is determined if the vehicle body slip angle β and vehicle body slip angle increment Δβ meet the prescribed condition. This condition is met when the vehicle body slip angle β is equal to or greater than a threshold value β1 and the vehicle body slip angle change rate Dβ (degrees/sec) is equal to or greater than a threshold value Dβ or when the vehicle body slip angle β is equal to or greater than a threshold value β2 (>β1). When this condition is met, the program advances to step ST55.

In step ST50, and steps ST52 to ST54, it is determined if the condition for starting the moment control is met. If it is determined in any of these steps that the condition for starting the moment control is not met, the current loop of the subroutine is terminated.

In step ST51, it is determined if the vehicle speed meets the prescribed condition for terminating the moment control. If the vehicle speed is equal to or lower than a lower speed limit (10 km/h, for instance), the current loop of the subroutine is terminated because the condition for terminating the moment control has been met. Otherwise, the program flow advances to step ST56 as a case of the condition not being met. In step ST56, it is determined if the vehicle slip angle and yaw rate have a same sign. If it is the case or they have a same sign, the program flow advances to step ST57.

In step ST57, it is determined if the tire slip angle condition has been met (indicating that a stable condition has been restored). If this condition is met, the program flow advances to step ST58. Otherwise, the program flow advances to step ST55. Also if the signs of the vehicle body slip angle and yaw rate differ from each other in step ST56, the program flow advances to step ST58.

In step ST58, it is determined if a delay time (200 ms, for instance, by elapsing of which the vehicle body slip angle control may be terminated) has expired. If the delay time has not expired, the program flow advances to step ST55 to continue the vehicle body slip angle control. Otherwise, the current loop of the subroutine is terminated.

Figure 16:
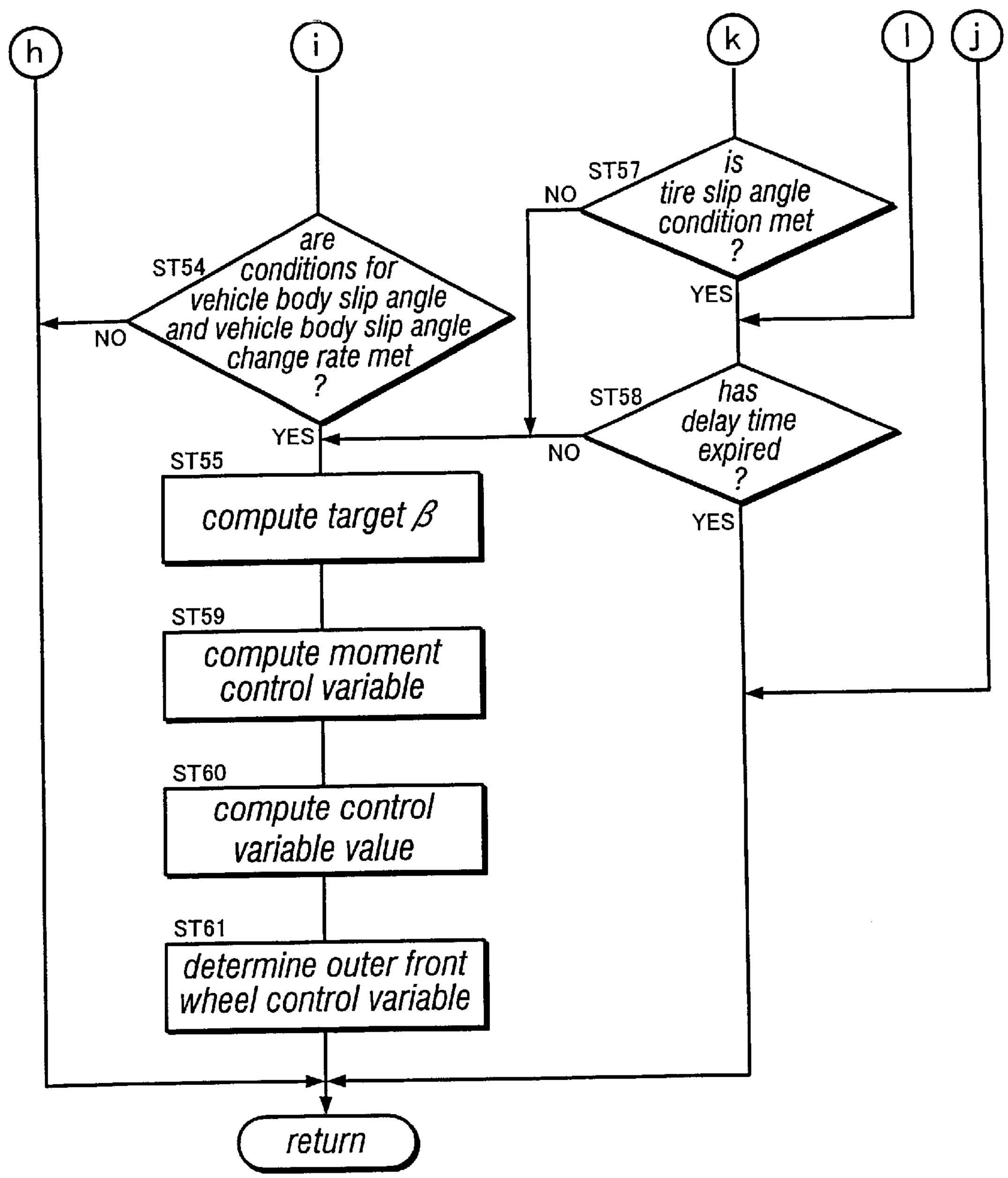
FIG. 16 is a third part of the subroutine flow chart for computing the degree of the vehicle momentum control.
Figure 17:
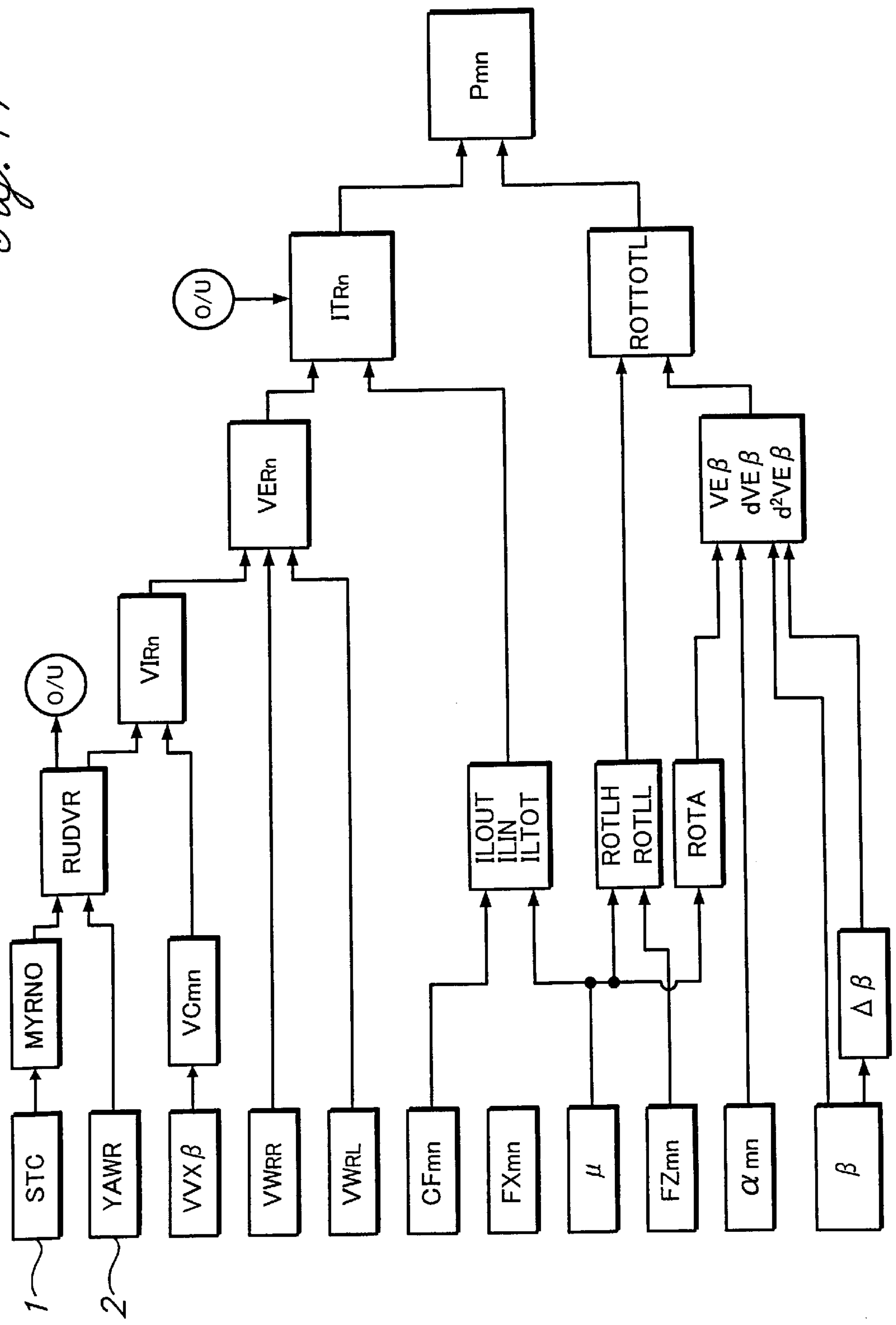
FIG. 17 is a block diagram showing the estimation logic for various control values in the vehicle motion control.

In step ST55, because the condition for the vehicle body slip angle has been met, the target vehicle body slip angle ROTA for this control is computed from the road surface frictional coefficient $\mu$ as shown in FIG. 16. In step ST59, the moment control variables (VEβ, dVEβ and $d^2$VEβ) are computed from the deviation between the target vehicle body slip angle ROTA and vehicle body slip angle β. Here, VEβ is a value obtained by subtracting the target vehicle body slip angle β (ROTALM) from the estimated vehicle body slip angle β, and indicates the deviation from the target vehicle body slip angle (limit angle). dVEβ is an increment (or a differential value) of this variable, and corresponds to the yaw rate when the target vehicle body slip angle β is a fixed value. $d^2$VEβ is a change rate of the change rate (a second order differential value of the deviation), and corresponds to the yaw rate increment when the target vehicle body slip angle β is a fixed value. In step ST60, the limiter values (ROTLH and ROTLL) of these control variables are computed according to the road surface frictional coefficient $\mu$ and wheel loads $FZ_{mn}$. In step ST61, the moment control variables (VEβ, dVEβ and $d^2$VEβ) are limited by the limiter values (ROTLH and ROTLL) and the outer front wheel control variable ROTTOTL is determined before this routine is terminated.

Depending on if oversteer or understeer is detected by the target wheel speed modification ratio computing unit RUDVR as well as the rear wheel control variable $IT_{Rn}$ and outer front wheel control variable ROTTOTL, the target hydraulic pressures of the four wheels for the brake control are determined in a target hydraulic pressure determining unit $P_{mn}$, and the corresponding brake forces of the four wheels are produced by a brake force control unit VEU. The target hydraulic pressure determining unit $P_{mn}$ and brake force control unit VEU jointly form the means for controlling the brake force which not only reduces the kinetic energy of the vehicle but also controls the vehicle body moment, and controls the drift out of the vehicle.

Figure 18:
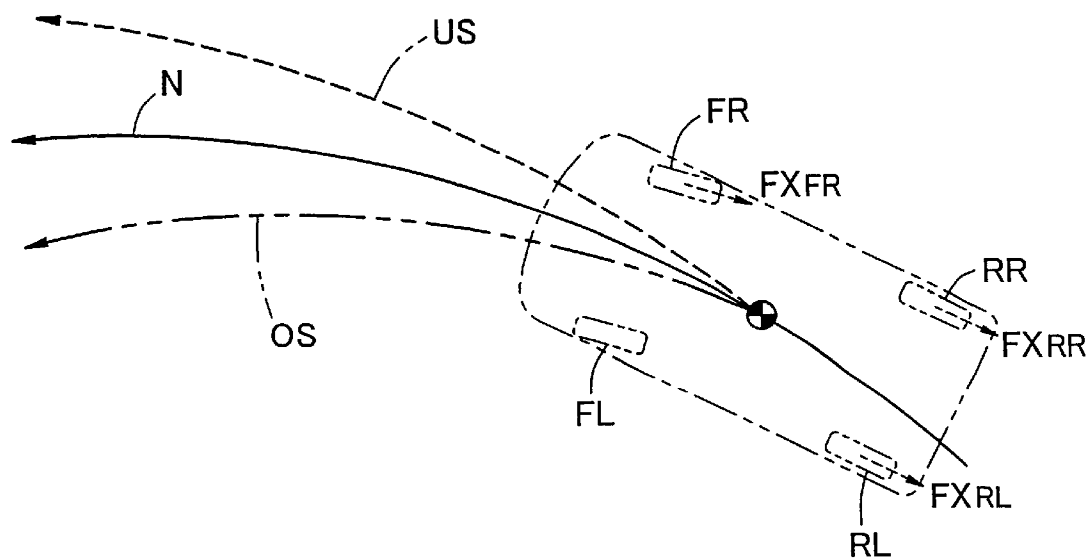
FIG. 18 is a diagram showing the control mode at the time of understeer/oversteer.

For instance, as shown in FIG. 18, when the neutral travel path of a vehicle turning a corner is given by the solid line arrow N in the drawing, the travel path would be given as indicated by the broken line arrow US in the case of understeer, and as indicated by the imaginary line arrow OS in the case of oversteer.

In the case of understeer, brake forces $FX_{RR}$ and $FX_{RL}$ are applied to the rear wheels RR and RL according to target hydraulic pressures $P_{RR}$ and $P_{RL}$ which are in turn determined according to the dynamic state of the vehicle and road surface condition as described above. This allows the vehicle (which otherwise has an understeer tendency) to travel along the neutral cornering path. In the case of oversteer, not only brake forces $FX_{RR}$ and $FX_{RL}$ are applied to the rear wheels RR and RL according to target hydraulic pressures $P_{RR}$ and $P_{RL}$ but also a brake force $FC_{FR}$ is applied to the outer front wheel (right front wheel FR in the illustrated embodiment) according to a target hydraulic pressures $P_{FR}$. This again allows the vehicle (which otherwise has an oversteer tendency) to travel along the neutral cornering path.

When an attempt is made to regain the vehicle from a state involving a large vehicle body slip angle to a more stable state either manually or automatically, according to the prior art, the inertia of the vehicle body tends to cause an overshoot in the opposite direction, and it could cause an unstable oscillating movement of the vehicle. The control process for preventing such an overshoot and ensuring a stable movement to the vehicle is described in the following.

Figure 19:
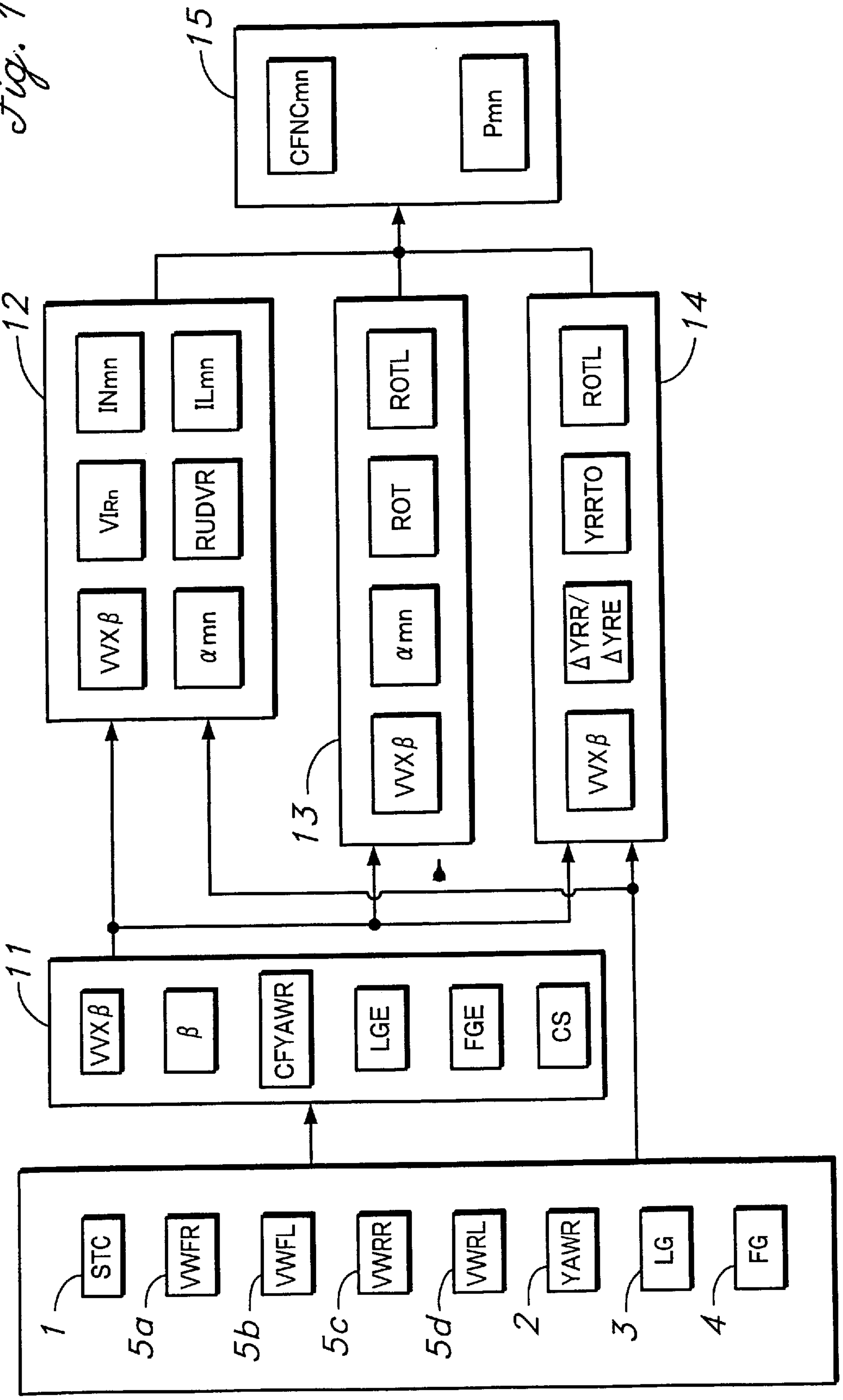
FIG. 19 is a block diagram showing the vehicle body slip angle control logic.
Figure 20:
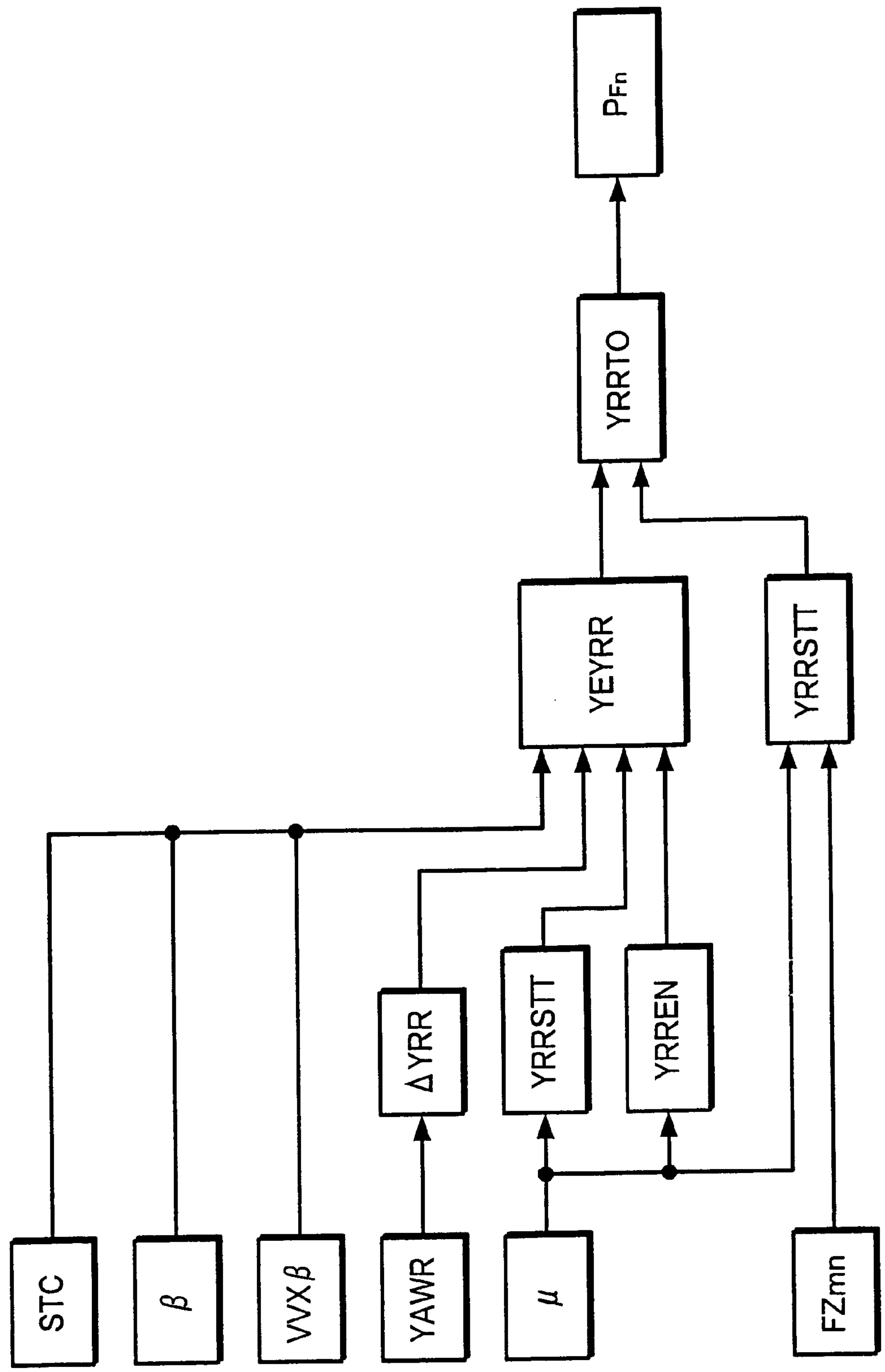
FIG. 20 is a block diagram showing the vehicle moment control logic.

In such a vehicle motion control, the vehicle body slip angle control logic shown in FIG. 19 and the inertia moment control logic shown in FIG. 20 may be used. Referring to FIG. 19, to control the vehicle body slip angle β, first of all, various estimated values such as the estimated vehicle body speed (X-component) VVXβ, vehicle body slip angle β, estimated yaw rate CFYAWR, estimated lateral acceleration LGE and estimated fore-and-aft acceleration FGE are determined from the output values of the various sensors in a value estimating block 11. These estimated values and output values of the sensors are forwarded to a vehicle motion momentum control block 12, a vehicle body slip angle control block 13 and inertia moment control block 14. The value estimating block 11 is incorporated with a counter steer determining unit CS.

In the vehicle motion momentum control block 12, the estimated vehicle body speed (X-component) VVXβ, basic target rear wheel speeds $VI_{Rn}$, vehicle momentum reduction control variables $IN_{mn}$, tire slip angles $\alpha_{mn}$, target wheel speed modification ratio RUDVR and limiter values IL are obtained. The vehicle momentum reduction control variables $IN_{mn}$ each consist of a deviation IN of the actual fore-and-aft force of each of the rear wheels that is controlled from the target fore-and-aft force of the corresponding rear wheel, and is in fact a sum $INETO_{mn}$ of a proportional term $INP_{mn}$, integral term $INI_{mn}$ and differential term $IND_{mn}$. The limiter values IL include the limiter value INELMOUT for the outer rear wheel in case of understeer, limiter value INELMIN for the inner rear wheel in case of understeer, limiter value INELMRR for the right rear wheel in case of non-understeer, and limiter value INELMRL for the left rear wheel in case of non-understeer. The vehicle memntum reduction control values $IN_{mn}$ are given as final values that are subjected to a limiter process.

In the vehicle body slip angle control block 13, the estimated vehicle body speed (X-component) VVXβ, tire slip angles $\alpha_{mn}$, vehicle body slip angle control variable ROT and limiter value ROTL for the control variable are obtained. The vehicle body slip angle control variable ROT consists of ROTPBT, ROTIBT, ROTDBT, ROTDDBT and ROTTOL, and the control value limiter value ROTL consists of ROTLH and ROTLL.

In the inertia moment control block 14, the estimated vehicle body speed (X-component) VVXβ, yaw moment ΔYRR/ΔYRE, inertia moment control variable YRRTO and limiter values ROTL for this control variable are obtained. The control logic in the inertia moment control block 14 is described in the following with reference to FIG. 20.

As shown in FIG. 20, the steering angle STC, vehicle body slip angle β and estimated vehicle body speed (X-component) VVXβ are forwarded to an inertia moment control target deviation computing unit YEYRR. The actual yaw rate increment ΔYRR is also forwarded to the inertia moment control target deviation computing unit YEYRR. Based on the road surface frictional coefficient μ, an inertial moment control start threshold value YRRSTT is obtained in an inertial moment control start threshold value computing unit YRRSTT, and an inertial moment control end threshold value YRREN is obtained in an inertial moment control end threshold value computing unit YRREN. An inertia moment control target deviation YEYRR is obtained in an inertia moment control target deviation computing unit YEYRR according to the values STC, β, VVXβ, ΔYRR, YRRSTT and YRREN.

Control variable limiter values ROTLH and ROTLL are obtained in a control variable limiter value computing unit ROTL according to the road surface frictional coefficient μ and wheel loads $Z_{mn}$. An inertia moment control variable YRRTO is obtained in an inertia moment control variable computing unit YRRTO according to the inertia moment control target deviation YEYRR and limiter values ROTL. Target hydraulic pressures $P_{Fn}$ for the front wheels are obtained in a target hydraulic pressure computing unit $P_{mn}$ according to the inertia moment control variable YRRTO.

Referring to FIG. 19, in the vehicle body slip angle control logic, the values from the vehicle motion momentum control block 12, vehicle body slip angle control block 13 and inertia moment control block 14 are forwarded to a wheel control unit 15. The wheel control unit 15 then computes control wheel selection values $CFNC_{mn}$ and target hydraulic pressures $P_{mn}$ according to these values, and execute a control process for producing a corresponding brake force in each of the wheels that are the subject of the control process.

The motion control of a vehicle which is steered to the right and left in succession is now described in the following with reference to the flow chart of FIG. 21, and diagrams of FIGS. 22 and 23. This control process is typically executed as a subroutine process.

In step ST71, the vehicle body slip angle β, yaw rate YAWR and steering angle STC are read out. In step ST72, it is determined if a control flag (FLAG) is on. If the control flag FLAG is on (which means that the motion control process is in progress), the program flow advances to step ST73 to determine the upper limit brake force for the outer front wheel. This upper limit brake force is determined as a brake force that can produce a maximum brake force in the outer front wheel without locking it. The outer wheel is determined as the right front wheel when the steering angle STC indicates a leftward turn and as the left front wheel when the steering angle STC indicates a rightward turn.

In step ST74, it is determined if the yaw rate YAWR is decelerating. If the yaw rate YAWR is decelerating, the program flow advances to step ST75 to reset the flags. If the yaw rate YAWR is not decelerating in step ST74, the current loop of the subroutine is terminated.

The deceleration of the yaw rate YAWR is determined if the product of the yaw rate YAWR and actual yaw rate increment ΔYRR is negative (YAWR×ΔYRR<0) and the absolute value of the actual yaw rate increment is equal to or smaller than a threshold value (threshold value≧|ΔYRR|). Therefore, when the sign of the actual yaw rate increment ΔYRR has changed, the control process is terminated.

If the control flag FLG is off (the motion control has not started) in step ST72, the program flow advances to step ST76 where it is determined if a condition flag (condition flag) is on. If the condition FLAG is on (monitoring), the program flow advances to step ST77, and execute the monitoring and controlling process in steps ST77 and ST78.

In step ST77, it is determined if the sign of the yaw rate YAWR has changed. This can be accomplished by determined if the product of the yaw rate YAWR(n) of the current loop and the yaw rate YAWR(n−1) of the preceding loop (YAWR(n)×YAWR(n−1)<0) has become negative.

Figure 22:
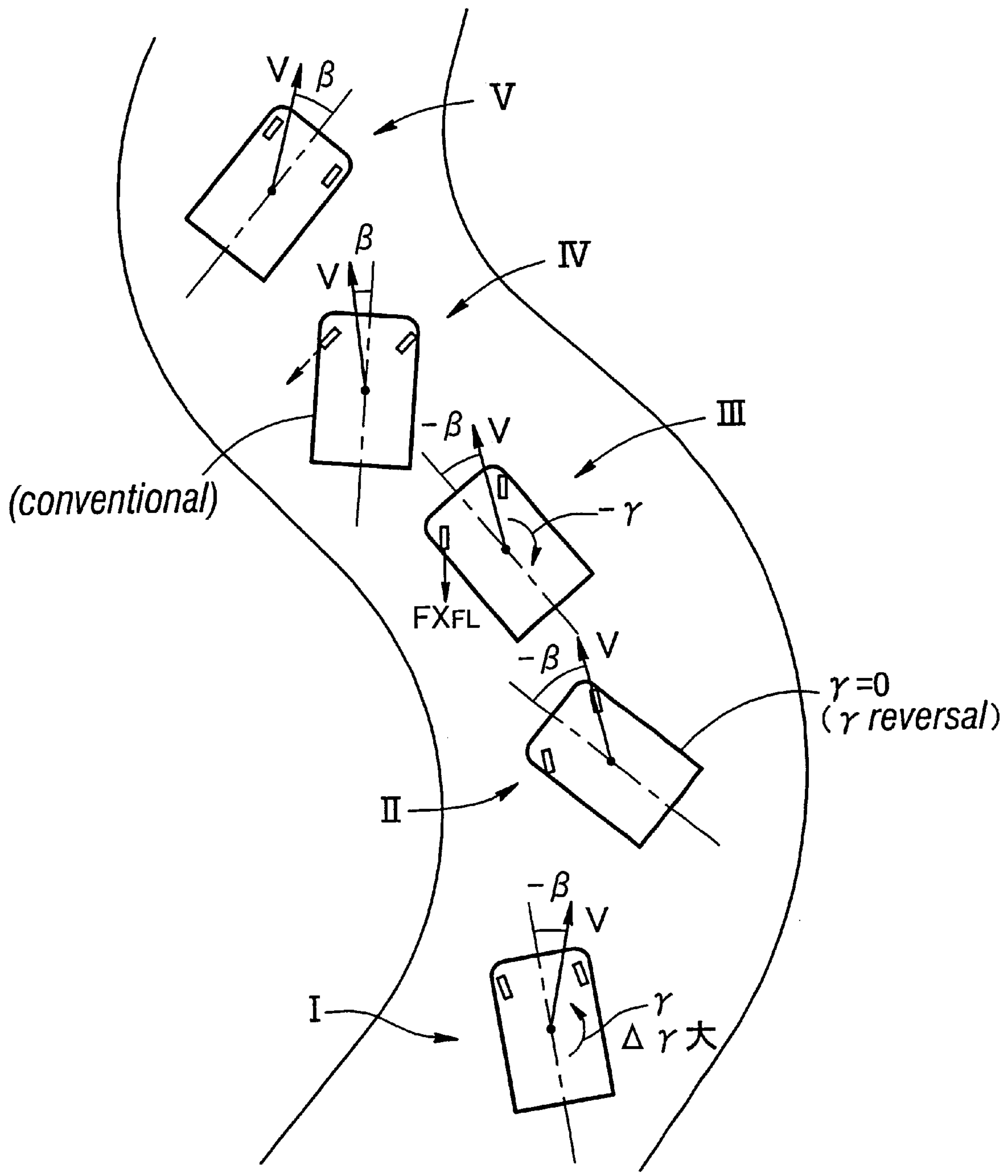
FIG. 22 is a diagram showing the various states of a traveling vehicle.

Suppose a case where a vehicle travels an S-curve as shown in FIG. 22 and is required to be steered successively. When a counter steer action is taken in the state indicated by I in the drawing, a yaw rate YAWR (denoted by γ in the drawing) is produced, and a substantial actual yaw rate increment ΔYRR (denoted by Δγ in the drawing) is produced. If the yaw rate YAWR is zero and a maximum vehicle body slip angle βmax occurs at a point indicated by II in FIG. 22, this is the point at which the sign of the yaw rate YAWR reverses.

Figure 23:
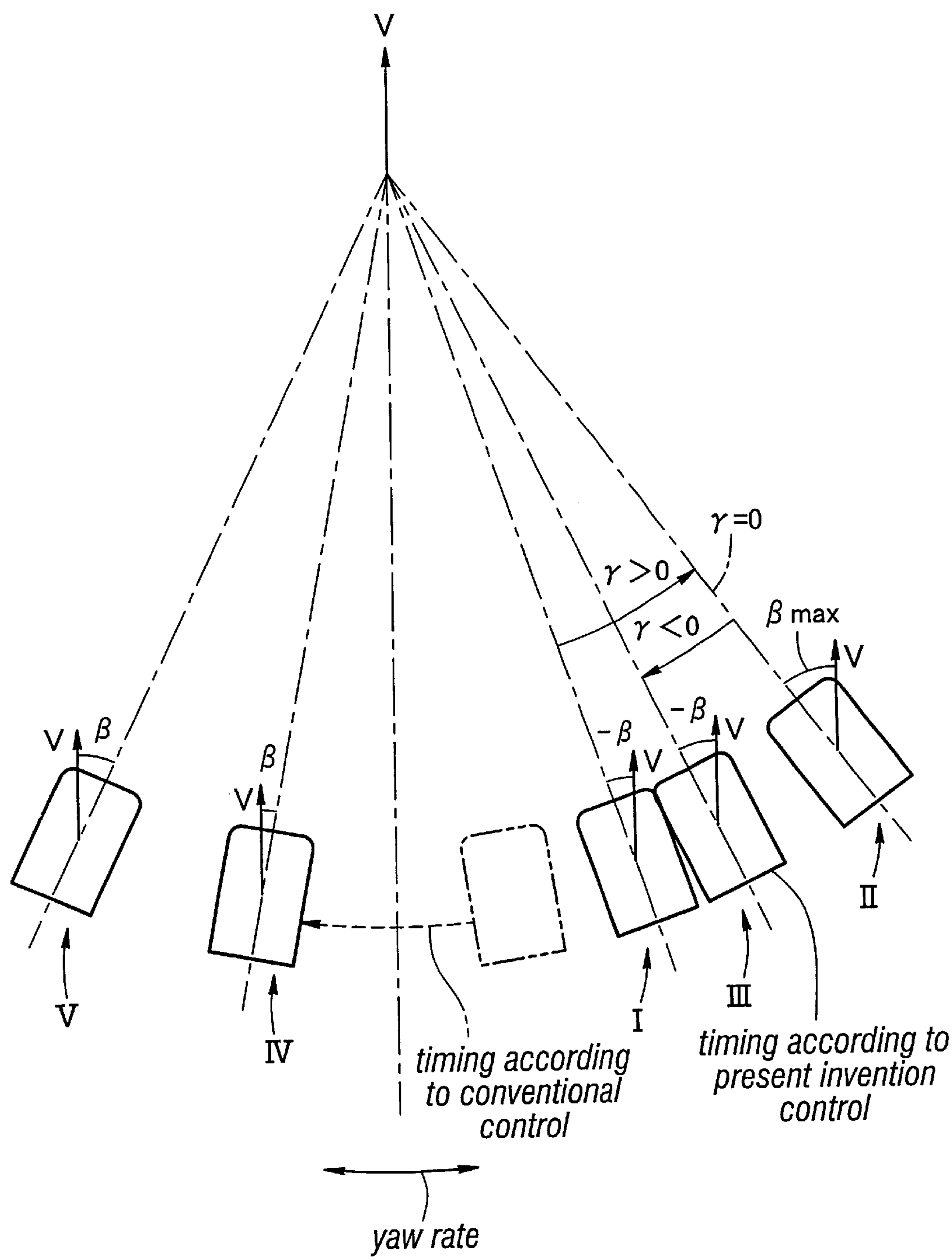
FIG. 23 is a diagram showing the principle of the pendulum control in connection with FIG. 22.

When this vehicle undergoing this motion is viewed from above, it can be viewed as undergoing a swing motion as shown in FIG. 23. In the drawing, the vehicle is traveling upward in the drawing, and the direction of the vehicle speed V agrees with the traveling direction. Therefore, the state involving the maximum vehicle body slip angle βmax will be as shown in the right end (II) of the drawing.

In step ST77, if the sign of the yaw rate YAWR has reversed, the program flow advances to step ST78. Otherwise, the current loop of the subroutine is terminated. In step ST78, it is determined if the absolute value of the actual yaw rate increment ΔYRR is equal to or greater than a threshold value $\gamma_a$. If it is the case, the program flow advances to step ST79 to set up the control flag (control FLAG) and start the control process before the current loop of the subroutine is terminated.

In the subsequent loop of the control process, the program flow advances from step ST72 to step ST73. Therefore, because the front wheel is steered to the right in the illustrated embodiment as indicated by III in FIG. 22, owing to the control action executed in step ST73, a brake force $FX_{FL}$ is produced in the left front wheel. This reduces the vehicle body slip angle β, and stabilizes the state of the vehicle.

When the condition FLAG is determined to be off (stable condition) in step ST76, or when the absolute value of the actual yaw rate increment ΔYRR is smaller than a threshold value $\gamma_a$ in step ST78, the program flow advances to step ST80. In steps ST80 and ST81, a presence of an unstable condition is determined.

In step ST80, it is determined if a counter steer action is being taken in the counter steer determining unit CS. This can be accomplished by determining if the product of the yaw rate YAWR and steering angle STC is negative (YAWR×STC<0). If a counter steer condition is detected, the program flow advances to step ST81. If a counter steer condition is not detected, the program flow advances to step ST82 to turn off the condition FLAG because the vehicle is in a stable state.

In step ST81, it is determined if the absolute value of the vehicle body slip angle β is equal to or greater than a threshold value $\beta_a$. If it is the case, the program flow advances to step ST83 to turn on the condition FLAG because the vehicle is in an unstable state. More specifically, if the absolute value of the vehicle body slip angle β is equal to or greater than a threshold value $\beta_a$ and a counter steer action is detected, the state is considered as hazardous. After going through steps ST82 and ST83, the current loop of the subroutine is terminated.

If the condition FLAG is turned on in step ST83, the program flow advances to step ST77 in the next loop of the control process. If an unstable condition is detected in step ST78 which follows step ST77, the control FLAG is turned on in step ST79. Therefore, step ST73 is executed in the subsequent loop of the control process. In this case also, a brake force is produced in the outer front wheel, and the vehicle body slip angle β is reduced. This stabilizes the state of the vehicle, and the vehicle travels as indicated by IV and V in FIG. 22.

According to the conventional motion control, the control action starts as the state indicated by the imaginary lines moves to the state indicated by IV in FIG. 23, and the brake force is produced only in the state indicated by IV in FIG. 22. Therefore, there is a certain delay in the control action.

On the other hand, according to the motion control of the present invention, the condition for starting the control action is based on the detection of a counter steer action, yaw rate YAWR and actual yaw rate increment ΔYRR. Therefore, as soon as the maximum vehicle body slip angle βmax has been reached, the increases in the yaw rate and actual yaw rate increment ΔYRR at the next corner can be predicted, monitored and controlled, and this ensures a stable state of the vehicle.

In the foregoing embodiment, the control action was based on the distribution of a brake force to the different wheels, but it is also possible to distribute a drive force or traction to the different wheels to achieve a similar goal. In such a case, drive force distributing system will be required for distributing the drive force to the different wheels.

Thus, according to the foregoing embodiment, when a counter steer action is taken while the vehicle corners, the outer front wheel is braked in a controlled manner upon detecting that the vehicle body slip angle and actual yaw rate increment are equal to or greater than threshold values. Therefore, even when a vehicle undergoes a swinging motion with the vehicle body slip angle reaching a maximum and being reduced thereafter, because the control system predicts and monitors the increase in the yaw rate and actual yaw rate increment before the maximum vehicle body slip angle has been reached, the vehicle is enabled to travel in a stable manner. In particular, even when the vehicle travels an S-curve and successive steering actions take place, the vehicle can travel in a stable manner.

Although the present invention has been described in terms of a preferred embodiment thereof, it is obvious to a person skilled in the art that various alterations and modifications are possible without departing from the scope of the present invention which is set forth in the appended claims.

What is claimed is:

1. A vehicle motion control system for controlling a motion of a vehicle during cornering, comprising:

a steering angle sensor for detecting a steering angle;

a yaw rate sensor for detecting an actual vehicle yaw rate;

an actual yaw rate increment computing unit for computing an increment of said actual yaw rate;

a vehicle body slip angle computing unit for estimating a vehicle body slip angle;

a brake force computing unit for controlling brake forces of right and left front wheels of said vehicle; and a counter steer detecting unit for detecting a counter steer action according to the steering angle and yaw rate;

said brake force computing unit being adapted to brake an outer front wheel in a controlled manner when a sign of said yaw rate has changed and said yaw rate increment has become equal to or greater than a threshold value after a counter steer action has been detected and said vehicle body slip angle has become equal to or greater than a threshold value.

2. A vehicle motion control system according to claim 1, wherein said counter steer detecting unit is adapted to detect a counter steer action when signs of said steering angle and yaw rate differ from each other.

* * * * *